United States Patent
Choi et al.

(10) Patent No.: US 10,228,927 B2
(45) Date of Patent: Mar. 12, 2019

(54) METHOD FOR DISTRIBUTING, INSTALLING, AND EXECUTING SOFTWARE-DEFINED RADIO APPLICATION

(71) Applicant: Neo SASTech Co., LTD., Seoul (KR)

(72) Inventors: Seung Won Choi, Seoul (KR); Hyun Wook Yang, Seoul (KR); Dong Hyun Kuem, Siheung-si (KR); Yong Jin, Seoul (KR); Kyung Hoon Kim, Seoul (KR)

(73) Assignee: Neo SASTech Co., LTD., Seoul (KR)

( * ) Notice: Subject to any disclaimer, the term of this patent is extended or adjusted under 35 U.S.C. 154(b) by 0 days.

(21) Appl. No.: 15/308,226

(22) PCT Filed: Apr. 29, 2015

(86) PCT No.: PCT/KR2015/004355
§ 371 (c)(1),
(2) Date: Jan. 12, 2017

(87) PCT Pub. No.: WO2015/167264
PCT Pub. Date: Nov. 5, 2015

(65) Prior Publication Data
US 2017/0147314 A1    May 25, 2017

(30) Foreign Application Priority Data

May 2, 2014  (KR) .................. 10-2014-0053688
Sep. 26, 2014 (KR) .................. 10-2014-0129597

(51) Int. Cl.
*G06F 9/445*    (2018.01)
*H04L 12/24*    (2006.01)
(Continued)

(52) U.S. Cl.
CPC .............. *G06F 8/61* (2013.01); *H04W 48/18* (2013.01); *G06F 9/545* (2013.01); *H04W 4/60* (2018.02); *H04W 72/08* (2013.01)

(58) Field of Classification Search
CPC .......... G06F 8/60; G06F 8/41; G06F 9/44547; G06F 9/545; G06F 9/45504; H04B 1/40
See application file for complete search history.

(56) References Cited

U.S. PATENT DOCUMENTS 9,680,700 B2 *   6/2017  Ivanov .................. H04B 1/40
2007/0207792 A1 * 9/2007  Loving ................. G06F 9/545
                                                   455/418
(Continued)

FOREIGN PATENT DOCUMENTS

KR    20120089653 A    8/2012
KR    20130004927 A    1/2013
(Continued)

OTHER PUBLICATIONS

Markus Mueck et al., Reconfigurable Radio Systems as Enabler for Exploiting the Future Heterogeneous Wireless Communications Landscape, Dec. 12, 2012, [Retrieved on Mar. 12, 2018]. Retrieved from the internet: <URL: https://docbox.etsi.org/workshop/2012/201212_rrs/presentations/> 17 Pages (1-17) (Year: 2012).*
(Continued)

*Primary Examiner* — Anibal Rivera
(74) *Attorney, Agent, or Firm* — Ladas & Parry LLP

(57) ABSTRACT

Disclosed is a method for distributing, installing, and operating a software-defined radio-based radio application independent of hardware and a user application. A radio application distribution method for installing a radio application in a user terminal using a radio application package comprises the steps of: generating a radio application package including a radio controller code, compiled by an application processor compiler, and a user-defined function block;

(Continued)

and uploading the radio application package to a server, wherein the radio controller code is in the form of an execution code executed by an application processor or radio computer of the user terminal, and provides a user application of the user terminal with context information of a radio application to be installed in the user terminal or defines a radio controller for transmitting and receiving data with a networking stack of a communication service layer located in the application processor.

12 Claims, 14 Drawing Sheets

(51) Int. Cl.
*H04L 27/06* (2006.01)
*G06F 8/61* (2018.01)
*H04W 48/18* (2009.01)
*G06F 9/54* (2006.01)
*H04W 72/08* (2009.01)
*H04W 4/60* (2018.01)

(56) References Cited

U.S. PATENT DOCUMENTS

| | | | | |
|---|---|---|---|---|
| 2009/0300656 | A1* | 12/2009 | Bosworth | G06F 12/0875 719/320 |
| 2010/0060422 | A1* | 3/2010 | Van Nest | G06K 7/0008 340/10.1 |
| 2010/0150276 | A1* | 6/2010 | Yew | H04H 60/27 375/340 |
| 2010/0235827 | A1* | 9/2010 | Rinne-Rahkola | G06F 8/60 717/174 |
| 2011/0312372 | A1* | 12/2011 | Miura | G06F 1/169 455/550.1 |
| 2012/0096445 | A1* | 4/2012 | Berg | G06F 9/44547 717/140 |
| 2012/0134666 | A1* | 5/2012 | Casterline | H04B 10/25754 398/22 |
| 2013/0003581 | A1* | 1/2013 | Marque-Pucheu | H04W 72/087 370/252 |
| 2013/0167127 | A1* | 6/2013 | Gu | G06F 8/41 717/140 |
| 2013/0295986 | A1* | 11/2013 | Mueck | H04W 48/18 455/552.1 |
| 2015/0178112 | A1* | 6/2015 | Ivanov | G06F 9/45504 718/1 |
| 2015/0207680 | A1* | 7/2015 | Ivanov | H04B 1/40 455/73 |

FOREIGN PATENT DOCUMENTS

KR 20130073374 A 7/2013
KR 20130116037 A 10/2013

OTHER PUBLICATIONS

Francesco Bivona et al., Reconfigurable Software Defined Radio Platform, Mar. 25, 2009, [Retrieved on Mar. 12, 2018]. Retrieved from the internet: <URL: https://pdfs.sernanticscholar.org/5d81/ead0c4dba79ab551e2044e67507b5fd6da08.pdf> 158 Pages (1-157) (Year: 2009).*

Marcus Mueck et al., Future of Wireless Communication: RadioApps and Related Security and Radio Computer Framework, 2012, [Retrieved on Nov. 19, 2018]. Retrieved from the internet: <URL: http://markus.muck.free.fr/data/PublishedVersion_IEEE_Wireless_Communications_Magazine.pdf> 8 Pages (9-16) (Year: 2012).*

Tevfik Yucek et al., A Survey of Spectrum Sensing Algorithms for Cognitive Radio Applications, 2009, [Retrieved on Nov. 19, 2018]. Retrieved from the internet: <URL: https://omidi.iut.ac.ir/SDR/2010/Ashoori_Rezaeinia/prj/ref/1%20A%20Survey%20of%20Spectrum%20Sensing%20Algorithms.pdf> 15 Pages (116-130) (Year: 2009).*

Firew Siyoum, et al; "Analyzing synchronous dataflow scenarios for dynamic software-defined radio applications", In: System on Chip (SoC), 2011 International Symposium on IEEE, Oct. 31-Nov. 2, 2011, pp. 14-21.

International Search Report dated Jul. 28, 2015; PCT/KR2015/004355.

* cited by examiner

METHOD FOR DISTRIBUTING, INSTALLING, AND EXECUTING SOFTWARE-DEFINED RADIO APPLICATION

CROSS-REFERENCE TO RELATED APPLICATIONS

This application is the 371 application of PCT Application No. PCT/KR2015/004355, filed Apr. 29, 2015, and claims priority under 35 U.S.C. § 119 to Korean Patent Application No. 10-2014-0053688, filed on May 2, 2014 in the Korean Intellectual Property Office and Korean Patent Application No. 10-2014-0129597, filed on Sep. 26, 2014 in the Korean Intellectual Property Office, the disclosures of which are incorporated herein by reference in their entirety.

TECHNICAL FIELD

The present invention relates to methods for distribution, installation, and execution of radio applications for a software-defined radio (SDR) terminal, and more particularly to methods for distribution, installation, and execution of SDR radio applications which operate independently on hardware and user applications.

BACKGROUND ART

As communication technology advances, various new kinds of radio applications are being used as adapted for tastes and objectives of users. The most of radio applications, such as a Long Term Evolution (LTE), a Wide-band Code Division Multiple Access (WCDMA), a Worldwide Interoperability for Microwave Access (WiMAX), a Global System for Mobile Communications (GSM), may operate on radio terminals by interworking with a modem embedded in the radio terminal.

In order to make it possible that a radio application controls the modem, a customized module should be developed based on understanding unique instructions of each modem designed by various modem manufactures or having various models. This situation leads to a result that a specific application can be executed on a specific modem designed by a specific manufacturer, or even on a specific model of modem designed by the specific manufacturer. To overcome the above-mentioned problem, different control instruction codes customized for various kinds of modems should be comprised in the radio application, or different executable file for each modem should be built and distributed.

However, since it is practically impossible to optimize the radio application to all the various kinds of modem hardware currently available in the market currently by the above-mentioned methods, there is a problem that a great manpower is needed to develop a radio application.

DISCLOSURE

Technical Problem

In order to resolve the above-described problems, the present invention provides methods for distributing software defined radio applications which operate independently on hardware and user applications.

In order to resolve the above-described problems, the present invention also provides methods for installing software defined radio applications which operate independently on hardware and user applications.

In order to resolve the above-described problems, the present invention also provides methods for operating software defined radio applications which operate independently on hardware and user applications.

Technical Solution

In an aspect of the present invention to achieve the above-described objective, a radio application distribution method for installing a radio application in a user terminal using a radio application package (RAP) is provided. The method may comprise generating a RAP including radio controller codes compiled by an application processor (AP) compiler and user-defined function block codes; and uploading the RAP to a server. Also, the radio controller codes are in form of executable codes executed by the AP or a radio computer of the user terminal, provide a user application of the user terminal with context information of a radio application to be installed in the user terminal, or define a radio controller for transmitting and receiving data with a networking stack of a communication service layer located in the AP.

Here, the user-defined function block codes may be included in the RAP in form of executable codes executed on the AP or the radio computer, or in form of source codes or intermediate representation (IR) which can be compiled to codes executable on the AP or the radio computer.

Also, the RAP may further comprise standard function block codes when the user-defined function block codes are included in the RAP in form of executable codes, and radio application codes including the standard function block codes and the user-defined function block codes may be included in the RAP as compiled by at least one compiler.

Also, the user-defined function block codes may be included in the RAP as compiled by a front-end compiler when the user-defined function block codes are included in the RAP in form of source codes.

Also, the RAP may further comprise pipeline configuration metadata for configuring pipelines of the radio application when the user-defined function block codes are included in the RAP in form of source codes or the IR, and the pipeline configuration metadata may define relations among the radio controller codes, the user-defined function block codes, and the standard function block codes for data transmission functions or data reception functions of the radio application.

In another aspect of the present invention to achieve the above-described objective, a radio application installation method for installing a radio application in a user terminal using a radio application package (RAP) is provided. The method may comprise downloading, from a server, a RAP including radio controller codes compiled by an application processor (AP) compiler of a radio application supplier and user-defined function block codes; and installing the RAP in the user terminal. Also, the radio controller codes are in form of executable codes executed by the AP or a radio computer of the user terminal, provide a user application of the user terminal with context information of a radio application to be installed in the user terminal, or define a radio controller for transmitting and receiving data with a networking stack of a communication service layer located in the AP.

Here, the user-defined function block codes may be included in the RAP in form of executable codes executed on the AP or the radio computer, or in form of source codes or intermediate representation (IR) which can be compiled to codes executable on the AP or the radio computer.

Also, the RAP may further comprise standard function block codes when the user-defined function block codes are included in the RAP in form of executable codes, and configuration codes including the standard function block codes and the user-defined function block codes may be installed in a storage device of the user terminal by an installer of the user terminal together with the radio controller or the radio controller codes included in the RAP.

Also, when the user-defined function block codes are included in the RAP in form of source codes, configuration codes including the user-defined function block codes may be compiled to executable codes by a compiler of the user terminal or a compiler of a cloud connected to the user terminal with pipeline configuration metadata of the RAP, and the compiled executable codes may be installed in a storage device of the user terminal by an installer of the user terminal together with the radio controller included in the RAP.

Also, when the user-defined function block codes of the configuration codes are compiled by referring to the pipeline configuration metadata, the compiler may generate the executable codes by compiling the user-defined function block codes together with standard function block codes in a radio library of the user terminal.

Also, the method may further comprise, before the installing the RAP in the user terminal, decrypting the configuration codes by using a decryptor of the user terminal or a decryptor of a cloud connected to the user terminal, and providing the decrypted configuration codes to the compiler.

Also, when the user-defined function block codes are included in the RAP in form of the IR, the configuration codes including the user-defined function block codes may be compiled to executable codes by a back-end compiler of the user terminal or a back-end compiler of the cloud connected to the user terminal with the pipeline configuration metadata of the RAP, and the compiled executable codes may be installed in a storage device of the user terminal by the installer of the user terminal together with the radio controller included in the RAP.

Also, when the user-defined function block codes of the configuration codes are compiled by referring to the pipeline configuration metadata, the compiler may generate the executable codes by compiling the user-defined function block codes together with standard function block codes in a radio library of the user terminal.

In yet another aspect of the present invention to achieve the above-described objective, a radio application execution method for executing a radio application stored in a storage device of a user terminal having an application processor (AP) and a radio computer is provided. The method may comprise receiving an execution instruction for the radio application; in response to the execution instruction, executing, by a first loader operating in a first operating system of the AP, radio controller execution codes installed in the storage device of the user terminal in the AP; and in response to the execution instruction, executing, by a second loader operating in a radio operating system of the radio computer, functional block execution codes installed in the storage device of the user terminal in the radio computer.

Here, one or both of the first loader and the second loader may refer to pipeline configuration metadata for the radio application installed in the storage device, and the pipeline configuration metadata may define relations among the radio controller execution codes and the function block execution codes for data transmission functions or data reception functions of the radio application.

Here, the function block execution codes may include standard function block execution codes which are codes calling function blocks implemented using dedicated hardware accelerators included in the radio computer or executable codes operating on the radio computer of the user terminal; and user-defined function block execution codes which are not provided as the standard function block execution codes or which are customized from functions provided by the standard function block execution codes.

Here, the second loader may execute, in the radio operating system of the radio computer, a radio library stored in the storage device together with the function block execution codes Here, the second loader may execute, in the radio operating system of the radio computer, standard function block execution codes in a radio library of the user terminal, by linking the standard function block execution codes and user-defined function block execution codes of the function block execution codes.

In yet another aspect of the present invention to achieve the above-described objective, a radio application distribution method using a radio application package for installing a radio application into a terminal, the method may comprise generating a radio application package; and uploading the radio application package to a server, wherein the radio application package includes radio controller codes, function block codes, and pipeline configuration metadata.

Here, the function block codes may include standard function block codes which are codes calling function blocks implemented using dedicated hardware logics included in a radio processor of the terminal or codes operating on a core of the radio processor of the terminal; and user-defined function block codes which are not provided as the standard function block codes or which are customized from functions provided by the standard function block codes.

Also, when the standard function block codes are provided as execution codes executable on the radio processor of the terminal, the radio application package may further include a radio library comprising the execution codes.

Also, the user-defined function block codes may be at least one of execution codes executable on the radio processor of the terminal, source codes which can be compiled into execution codes executable on the radio processor of the terminal, and intermediate representation (IR) codes which can be compiled into execution codes executable on the radio processor of the terminal.

Also, when the user-defined function block codes are source codes or IR codes, the user-defined function block codes may be included in the radio application package as encrypted.

Also, the pipeline configuration metadata may define relations among the radio controller codes, the user-defined function blocks, and the standard function blocks for data transmission functions or data reception functions of the radio application.

Also, the radio controller codes may be execution codes executed on an application processor or the radio processor of the terminal, provide a user application with context information of the radio application, and transmit/receive data with a networking stack of a communication service layer existing on the application processor or the radio processor.

In yet another aspect of the present invention to achieve the above-described objective, a method for installing a radio application into a user terminal by using a radio application package, the method may comprise downloading a radio application package from a server; and installing a radio application included in the radio application package into the user terminal, wherein the radio application package includes radio controller codes, function block codes, and pipeline configuration metadata.

Here, the function block codes may include standard function block codes which are codes calling function blocks implemented using dedicated hardware logics included in a radio processor of the terminal or codes operating on a core of the radio processor of the terminal; and user-defined function block codes which are not provided as the standard function block codes or which are customized from functions provided by the standard function block codes.

Also, when the standard function block codes are provided as execution codes executable on the radio processor of the terminal, the radio application package may further include a radio library comprising the execution codes.

Also, the user-defined function block codes may be at least one of execution codes executable on the radio processor of the terminal, source codes which can be compiled into execution codes executable on the radio processor of the terminal, and intermediate representation (IR) codes which can be compiled into execution codes executable on the radio processor of the terminal.

Also, when the user-defined function block codes are source codes or IR codes, the user-defined function block codes may be compiled using a compiler executed by the application processor or the radio processor of the terminal.

Also, when the user-defined function block codes are source codes or IR codes, the user-defined function block codes may be included in the radio application package as encrypted.

Also, the radio controller codes may be execution codes executed on an application processor or the radio processor of the terminal, provide a user application with context information of the radio application, and transmit/receive data with a networking stack of a communication service layer existing on the application processor or the radio processor.

Also, in the installing the radio application, the radio controller codes and the function block codes may be installed into a storage device which can be accessed by at least one of an application processor and a radio processor of the terminal by referring to the pipeline configuration metadata.

In yet another aspect of the present invention to achieve the above-described objective, a method of executing a radio application comprising function block codes and radio controller codes in a terminal having an application processor and a radio processor, the method may comprise receiving an execution instruction for the radio application; and loading the radio controller codes and the function block codes from a storage part by referring to pipeline configuration metadata of the radio application, wherein the radio controller codes are executed by the application processor or the radio processor, and the user-defined function block codes are executed by the radio processor.

Here, the function block codes may include standard function block codes which are codes calling function blocks implemented using dedicated hardware logics included in a radio processor of the terminal or codes operating on a core of the radio processor of the terminal; and user-defined function block codes which are not provided as the standard function block codes or which are customized from functions provided by the standard function block codes.

Also, a radio control framework which operates on at least one of the application processor and the radio processor may provide the radio controller codes and the function block codes with operation environments.

Also, when the radio control framework operates on both the application processor and the radio processor, the radio control framework may be configured to comprise a part executed on the application processor and a part executed on the radio processor.

Also, when the radio control framework operates on both the application processor and the radio processor, the radio controller codes may operate on the application processor.

Also, when the radio control framework operates only on the radio processor, the radio controller codes may operate only on the radio processor.

Also, the radio control framework may include at least one of a configuration manager (CM) performing installation/uninstallation of the radio application and creating/deleting an instance of the radio application and managing radio parameters for the radio application; a radio connection manager (RCM) performing activation/deactivation of the radio application and managing user data flow switching between radio applications; a flow controller (FC) controlling sending/receiving and flows of user data packets; a multi-radio controller (MRC) scheduling requests for spectrum resources issued by radio applications; and a resource manager (RM) sharing radio resources with radio applications.

Advantageous Effects

When a software defined radio terminal apparatus according to the present invention, as described above, is used, the same application may be executed in terminals having modem chips with different structures thorough a standard baseband API.

Also, by providing various digital signal processing algorithms needed in wireless digital communication based on the standard baseband API for optimal digital signal processing, manufacturers of modem hardware may select hardware or software implementation according to complexity and power consumption of each block included in the standard baseband API, and producers of radio applications may produce radio applications which are independent of the modem hardware using the standard baseband API.

Also, various extensions of the baseband API may be possible by providing user-defined type blocks to implement functions not included in the standard baseband API.

Also, using a static linking manner or a dynamic linking manner for a radio application, object codes (SFBs, etc.) can be linked with UDFBs during installation of the radio application distributed in form of executable codes, source codes, or intermediate representation (IR), or the object codes can be linked with the UDFBs during execution of the radio application. Accordingly, methods for distribution, installation, and operation of radio applications using radio application packages (RAPs), which can be efficiently applied to various user mobile devices, can be provided.

BEST MODE

Figure 1:
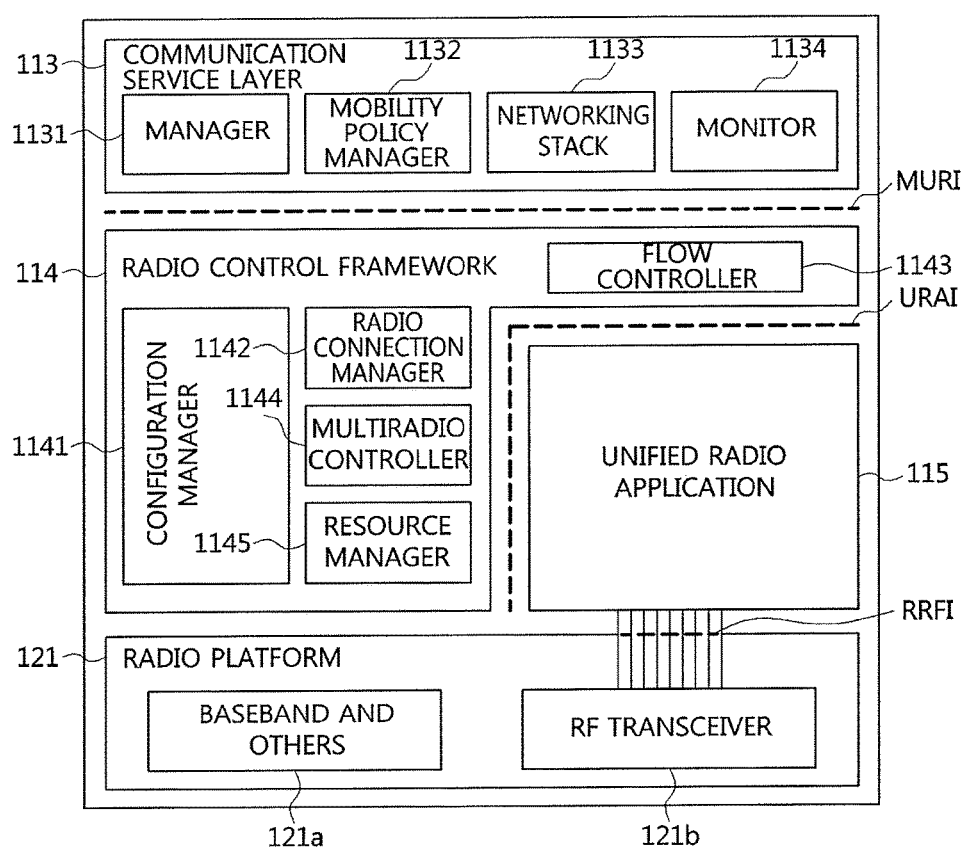
FIG. 1 is a block diagram to explain an architectural composition of a software defined radio terminal device (hereinafter, referred to as a 'mobile device') according to an exemplary embodiment of the present invention.

The present invention may be variously modified and may include various embodiments. However, particular embodiments are exemplarily illustrated in the drawings and will be described in detail. However, it should be understood that the particular embodiments are not intended to limit the present disclosure to specific forms, but rather the present disclosure is meant to cover all modification, similarities, and alternatives which are included in the spirit and scope of the present disclosure. Like reference numerals refer to like elements throughout the description of the drawings.

Relational terms such as first, second, A, B, and the like may be used for describing various elements, but the elements should not be limited by the terms. The terms are used solely for distinguishing one element from another. For instance, without departing the scope of the present disclosure, a first element may be named as a second element, and similarly, a second element may be named as a first element. The term "and/or" encompasses both combinations of the plurality of related items disclosed and any item from among the plurality of related items disclosed.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is not for delimiting the present invention but for describing the specific embodiments. The terms of a singular form may include plural forms unless otherwise specified. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be described in detail with reference to the accompanying drawings. In describing the invention, to facilitate the entire understanding of the invention, like numbers refer to like elements throughout the description of the figures, and a repetitive description on the same element is not provided.

Terminologies used for explaining the present invention are defined as follows. Other terminologies except the following terminologies will be defined in the corresponding part of the present specification.

Radio Application (RA): It is a SDR application used for reconfiguring a mobile device, which is distributed, installed, and executed according to exemplary embodiments of the present invention. Also, it's an application providing radio communication environments to the mobile device independently on specific hardware configurations or user applications. That is, the radio application may be software for performing radio frequency (RF) signal generation or demodulation of the received RF signal. Such the radio application may be implemented to operate on a radio computer, a specific radio platform, or a radio virtual machine (RVM) which is a part of the radio platform, or implemented to operate on two layers as divided into a part executed in a radio computer (referred to as a 'radio computer execution part') and a par executed in an application processor (referred to as a 'AP processor execution part').

Also, the radio application may have various representation forms. For example, the radio application may be provided in form of source codes, intermediate representation (IR), or executable codes. In case of the source codes, a radio library for calling radio hardware abstraction layer (HAL) functions and native implementations of the radio library may be provided. Also, in case of the IR, a radio library for calling radio HAL functions and native implementations of the radio library may be provided. The executable codes may be codes for a specific radio platform. Also, the radio application may comprise a radio controller (RC) and function blocks. The function blocks may include UDFBs, and further include radio library SFBs according to necessity. The radio application may be a unified radio application which is installed in the mobile device through a radio application package (RAP).

Radio Application Package (RAP): As a distribution form of a radio application, a RAP may include a radio controller code and function blocks which are components of the radio application, and also include pipeline configuration metadata. In addition, the radio application package may further include a radio library.

Standard Function Block (SFB): It is a standardized function block each of which has a standardized function and a standardized function name used for calling the function. In case that radio platform chip vendors develop the standard function blocks, the standard function blocks may be a set of function blocks implemented by the vendors, and may be provided with a driver used for driving the blocks. The standard function blocks may be implemented by using a dedicated hardware accelerator, or implemented as executable codes to be executed on a radio processor core. If the standard function blocks are implemented as executable codes to be executed on a radio processor core, a set of the standard function blocks may be referred to as a radio library. Each of the standard function blocks has standardized name and feature for its function, and may be defined by using a standard baseband Application Programming Interface (API) header.

User-Defined Function Block (UDFB): It is a function block which can be provided by radio application providers. A UDF may have a function which is not provided as a standard function block or a function which is customized from an existing standard function block. It may be implemented to be executed on a radio computer.

User-defined Function Block (UDFB) set: A set of user-defined function blocks which are provided by radio application providers.

Mobile Device Architecture for Radio Application

Figure 2:
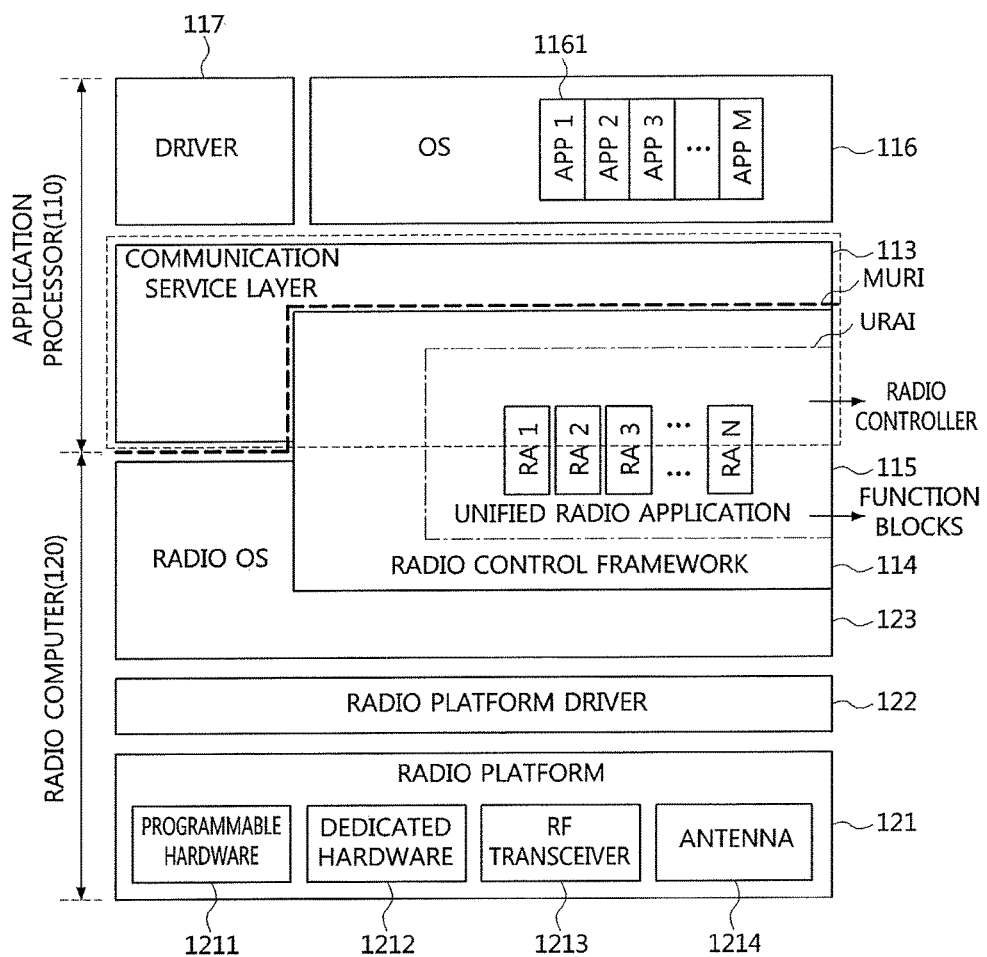
FIG. 2 is a block diagram showing a reference model of architecture of a mobile device for radio applications as an exemplary embodiment according to the present invention.

FIGS. 1 and 2 are block diagrams to explain a software architecture environment on which a radio application according to the present invention operates. FIG. 1 is a block diagram to explain an architectural composition of a SDR terminal device (hereinafter, referred to as a 'mobile device') for radio configuration, and FIG. 2 is a block diagram showing a reference model of an architecture of a mobile device for radio applications as an exemplary embodiment.

Referring to FIG. 1 and FIG. 2, a mobile device architecture according to an exemplary embodiment of the present invention may basically comprise a communication service layer (CSL) 113, a radio control frame work (RCF) 114, and a radio platform 121.

The CSL 113 is a layer supporting general applications such as internet accessing software. In order to support at least some of the following three services, the CSL 113 may be configured to comprise an administrator application 1131, a mobility policy manager application 1132, a networking stack (i.e. a protocol stack operating on the communication service layer) 1133, and a monitor application 1134, and may be connected to the RCF 114 via a multiradio interface (MURI). The MURI is an interface between the CSL 113 and the RCF 114.

The first service is related to an administrative. It may be a service related to installation/uninstallation of radio applications, creating/deleting instance of radio applications, and acquisition of a list of radio applications in each status (installed, instanced, activated).

The second service is related to connection control. It may be a service related to activation/deactivation of radio applications, creation of data flow, creation of network allocation, and acquisition of a list of radio applications in each status (installed, instanced, activated).

The third service is related to data flow. That is, this service is a service related to sending/receiving user data.

However, the communication service layer 113 may comprise only some of the above-described components, and may further comprise additional components as well as the above-described components. Also, one or more components among the above components may be integrated into a single component existing within the communication service layer. Also, the above-described components are only examples of components which the communication service layer can comprise in order to support services which should be performed by the communication service layer. That is, the communication service layer may be defined based on functions performed by it. The above-described exemplary composition of components does not restrict composition of the communication service layer.

The radio control framework (RCF) 114, as a part of the operating system (OS), is a control framework extending capability of the OS as well as radio resource management. The RCF 114 may be connected to a unified radio application 115 via a unified radio application interface (URAI). The URAI is an interface between radio applications and the RCF 114.

Further specifically, the RCF 114 is a component for providing operation environment of radio applications. In order to manage radio applications, the RCF 114 may basically comprise at least some of the following five components—a configuration manager (CM) 1141, a radio connection manager (RCM) 1142, a flow controller (FC) 1143, a multiradio controller (MRC) 1144, and a resource manager (RM) 1145.

Configuration Manager (CM) 1141: Installation/uninstallation and creating/deleting instance of radio applications into RP as well as access management of radio parameters for radio applications.

Radio Connection Manager (RCM) 1142: Activation/deactivation of RAs according to user requests, and overall management of user data flows, which can also be switched from one RA to another.

Flow Controller (FC) 1143: Sending and receiving of user data packets and controlling the flow of signaling packets.

Multiradio Controller (MRC) 1144: Scheduling the requests for radio resources issued by concurrently executing RAs and detecting and managing the interoperability problems among the concurrently executing RAs.

Resource Manager (RM) 1145: Managing the computational resources to share them among simultaneously active RAs, and to guarantee their real-time requirements. The RM 1145 may be a part of the OS.

However, the radio control framework 114 may comprise only some of the above-described five components, and may further comprise additional components as well as the five components. Also, one or more components among the above-described components may be integrated into a single component existing within the radio control framework 114.

The role of the radio control framework 114 may be defined based on functions performed by the components which will be described. The above-described exemplary components do not restrict composition of the radio control framework 114. That is, the radio control framework 114 may have various configurations at least some of functions of the above-described components.

The radio platform 121 is a part of hardware in the mobile device, which can generate RF signals or receive RF signals, and includes hardware for execution of function blocks. The hardware may be heterogeneous hardware including various signal processing components such as fixed or dedicated accelerators and reconfigurable accelerators. The dedicated accelerator may include an application-specific integrated circuit (ASIC), and the reconfigurable accelerator may include a field programmable gate array (FPGA), a graphic processing unit (GPU), a digital signal processing (DSP) unit, etc.

That is, the radio platform 121, as a part of the hardware of the mobile device which is related to radio signal processing capability, may include programmable hardware 1211, dedicated hardware 1212, RF transceiver 1213, and antenna 1214. The programmable hardware 1211 and the dedicated hardware 1212 may be included in a modem 1210 comprising a baseband part and other components, and the dedicated hardware 1212 may include hardware accelerators or baseband accelerators. Using the programmable hardware 1211, extendibility of the SFBs can be supported in the reconfigurable mobile device.

The baseband accelerator prepared for executing the function blocks may be usually provided in form of ASIC. Such the radio platform 121 may be connected to the unified radio application 115 via a reconfigurable radio frequency interface (RRFI). The RRFI is an interface between the radio platform 121 and the unified radio application 115.

The above-described radio platform 121 may correspond to a radio platform hardware, and be connected to the radio OS 123 via radio platform drivers 122. Here, the radio control framework 114 may operate on the radio OS 123 and the communication service layer 113.

In the above-described configuration, if the radio control framework 114 operates on the AP 110 and the radio computer 120, the radio control framework 114 may be divided to two groups or execution parts. For example, a first part may operate on the AP 110, and the other part may operate on the radio computer 120. It may be determined by a vendor of each radio application which components of the radio control framework 114 operate on the radio computer 120 in real time, and which components of the radio control framework 114 operate on the AP 110 in non-real time.

In the case that the radio control framework 114 operates on only the radio computer 120, the radio control framework 114 may be implemented to operate on only the radio computer 120 without separation of the part operating on the radio computer 120 and the part operating on the AP 110.

As described above, the mobile device architecture according to an exemplary embodiment may a radio controller operating on the AP 110 and function blocks operating on the radio computer 120 and/or the radio OS 123. The radio computer 120 may be a part of hardware in the mobile device for radio software architecture, and include peripheral devices such as a RF part such as a RF transceiver 1213 processing RF signals, etc.

Here, the radio computer 120 may be implemented on the programmable hardware 1211. In this case, the radio computer may correspond to at least part of the programmable hardware, hardware accelerators, and peripheral devices. If the computation capability of the radio computer is enough to execute the radio application, the radio computer can directly execute the radio application by using the radio library without additional hardware.

A non-real time OS such as Android OS of Google, iOS of Apple, etc. may operate on the application processor 110, and a real time OS (hereinafter, referred to as a 'radio OS') may operate on the radio computer 120. Hereinafter, for clear discrimination, the non-real time OS operating on the application processor 110 may be referred to as 'OS', and the real time OS operating on the radio computer 120 may be referred to as or 'real time OS' or 'radio OS'.

Hereinafter, components of a reference model of the mobile device architecture comprising the application processor 110 and the radio computer 120 will be described in detail.

Application Processor

The AP 110 in the mobile device may comprise, as shown in FIG. 2, the drivers 117, the OS 116, and the communication service layer 113.

The drivers 117 may drive hardware devices in the given OS 116. The hardware devices may include camera, speaker, etc.

The OS 116 may include non-real time OS such as Android, iOS, etc. which operates on the mobile device. One or more user applications 1161 may operate on the OS 116. The OS 116 may be referred to as a 'first OS' for discrimination with the radio OS which will be explained later.

The CSL 113 may support operations of one or more radio applications RA1, RA2, RA3, . . . , and RAN. Also, a radio controller which is a specific execution part of the radio application may operate in the CSL 113. If the RCF 114 operates on the radio computer 120, the RCF 114 may not exist in the AP 110 or the CSL 113.

According to an exemplary embodiment, in the case that the RCF 114 operates on both the AP 110 and the radio computer 120, the radio applications RA1, RA2, . . . , and RAN may be configured to transmit context information to the monitor 1134 of the CSL 113 through the radio controller which is the AP execution part, or exchange data with the networking stack 1133 of the CSL 113.

Radio Computer

The radio computer may comprise the radio OS 123, the radio platform drivers 122, and the radio platform 121, as shown in FIG. 2.

The radio OS 123 is a real time OS to which rights for software architecture reconfiguration, and installation or execution of function blocks are given by the RCF 114. The radio OS 123 may provide basic management capability related to management of the radio platform 121 such as resource management, file system support, unified access to hardware resources, etc. and the capability of the RCF.

The radio platform drivers 122, as hardware drivers of the radio OS 123, may interwork with the hardware of the radio platform. The composition and operations of the radio platform 121 was explained in the above.

The radio application according to exemplary embodiments of the present invention, which is an application for reconfiguring a mobile device, may be distributed in form of a radio application package (RAP). The RAP which is installed in the reconfigurable mobile device may comprise function block codes, radio application codes, and metadata (refer to FIG. 8).

Here, the function block codes may include codes for one or more SFBs and/or one or more UDFBs, and be installed in the radio computer operating in real time. In the case that the SFBs are distributed in form of executable codes, the RAP may be distributed as including a radio library in form of executable codes.

Also, the codes for the radio application may include radio controller codes (RC codes), and the metadata may include pipeline configuration metadata. The radio controller codes may be installed in the AP 110 for operations such as context information processing functions which do not need real-time processing.

The RAP may be downloaded from a server by the OS 116 of the AP 110, the configuration codes (referred to as 'configcodes') and radio library in the RAP may be loaded from the AP 110 to the radio computer 120 by referring to the pipeline configuration metadata, and the configcodes and radio library may be finally to the radio OS 123 of the radio computer 120.

Hereinafter, methods for distribution, installation, and execution of a radio application, according to exemplary embodiments of the present invention, will be described in further detail.

FIGS. 3 to 7 are conceptual diagrams showing methods for distribution, installation, and execution of a radio application, according to exemplary embodiments of the present invention.

According to exemplary embodiments of the present invention, a radio application may be distributed in form of at least one of executable codes, source codes, and intermediate representation (IR). However, before explanation of respective exemplary embodiments, basic configuration of methods for distributing, installing, and executing RAP or RA in form of executable codes, source codes, or IR will be explained, and then respective exemplary embodiments will be explained in detail.

The basic operation in the procedure of distribution, installation, and execution of a RAP for a target mobile device will be performed as follows.

A design/distribution time is a step in which a radio application is produced and distributed. In this step, a computing device of a producer or supplier of the radio application may prepare a RAP comprising radio controller codes and user-defined function blocks. Here, the radio controller codes or radio application codes may be composed as calling function blocks by using a standard radio library header defining a standard radio library interface. Meanwhile, the radio controller codes may be compiled by an application processor (AP) compiler in the distributor's computing device, and included in the RAP in form of executable codes.

Figure 3:
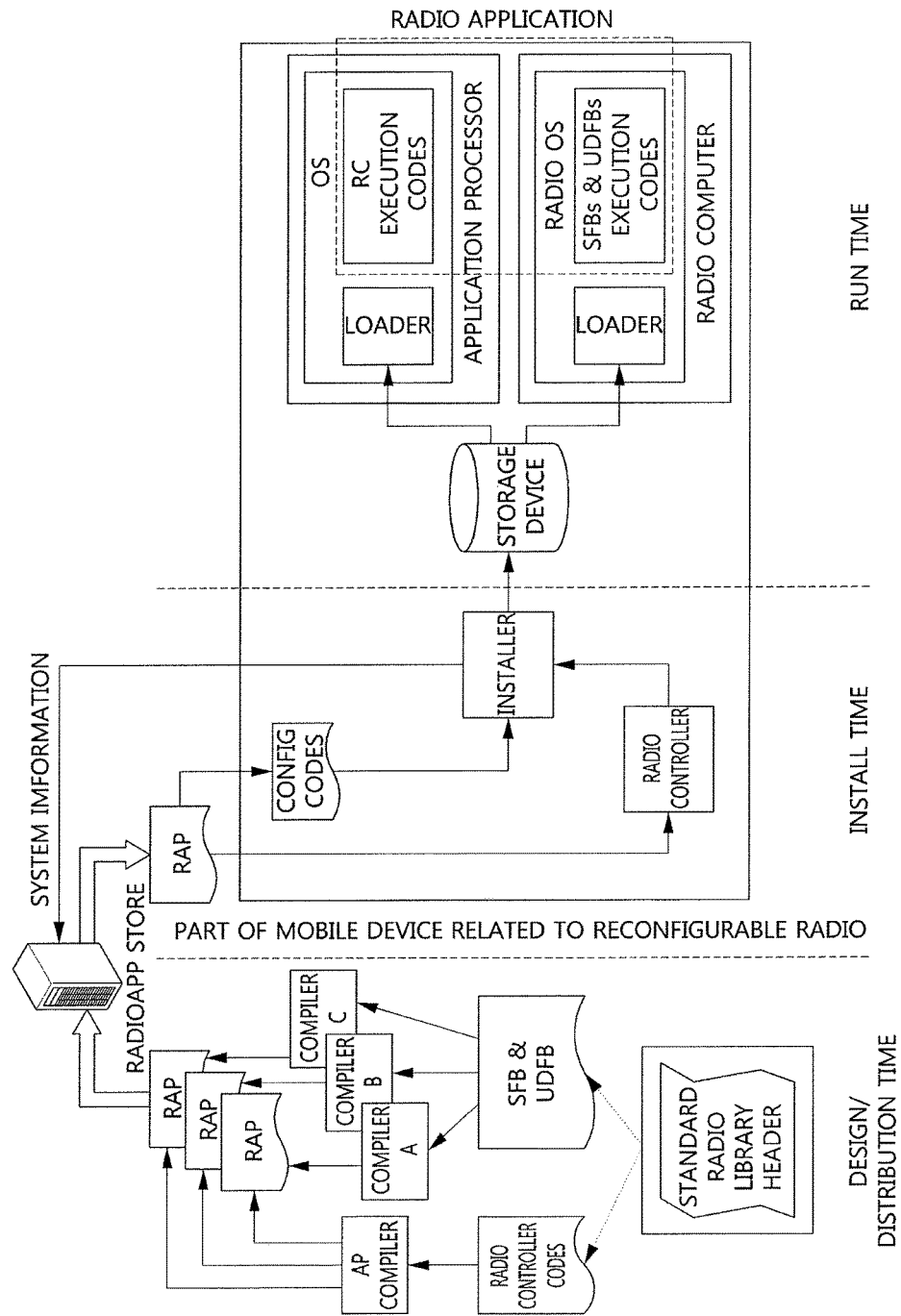
FIGS. 3 to 7 are conceptual diagrams showing methods for distribution, installation, and execution of a software defined radio application (hereinafter, referred to as a 'radio application') according to exemplary embodiments of the present invention.

In a case shown in FIG. 3, radio controller codes may be compiled by an AP compiler of the distributor's computing device, and included in the RAP in form of executable codes. In the case that the radio application codes are distributed in form of codes executable on the user's mobile device, radio application codes (referred to as 'configuration codes' or 'configcodes') may be compiled by a compiler suitable to an operation environment of the user's mobile device among various compilers, and included in the RAP in form of executable codes.

Figure 4:
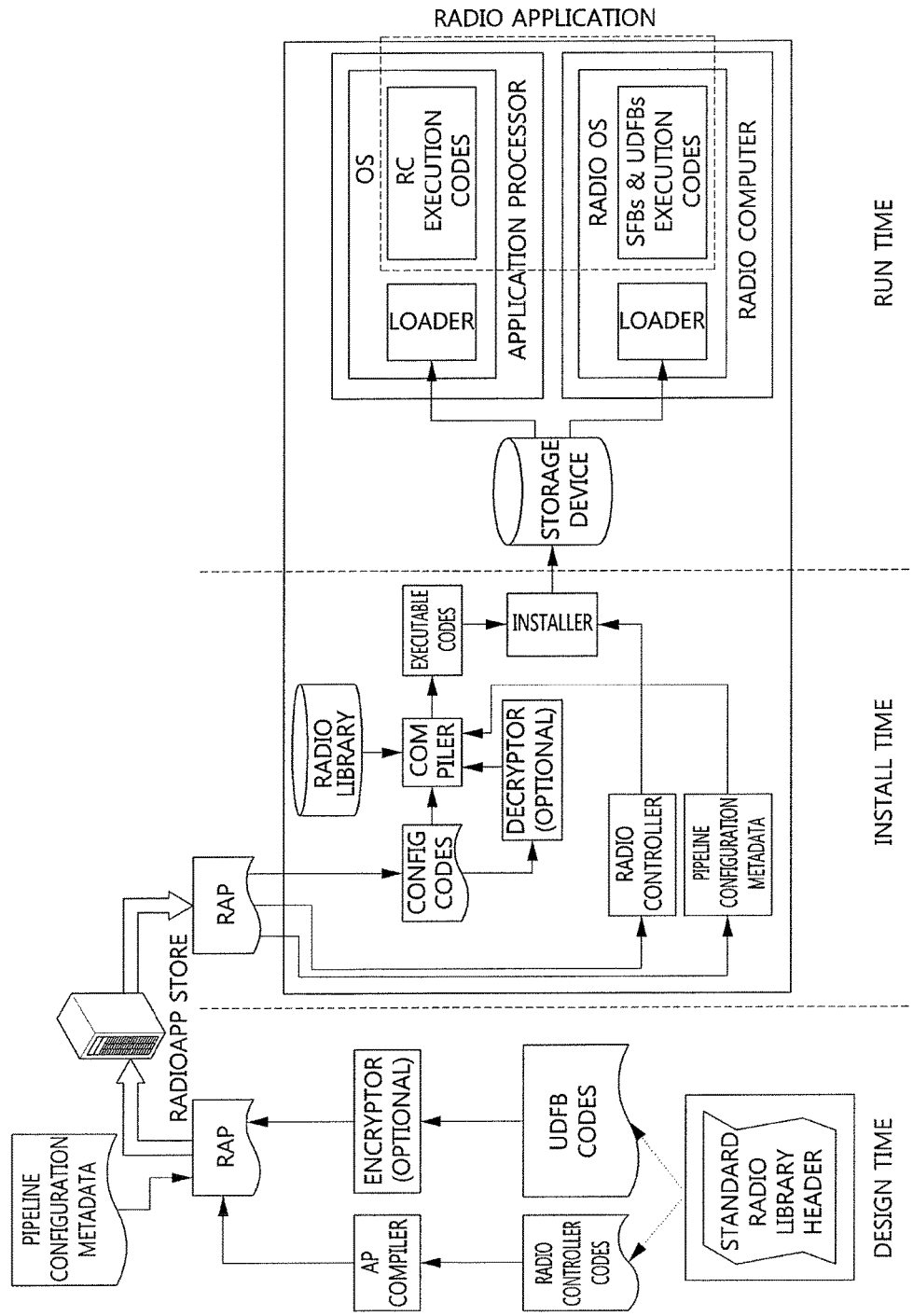
Figure 5:
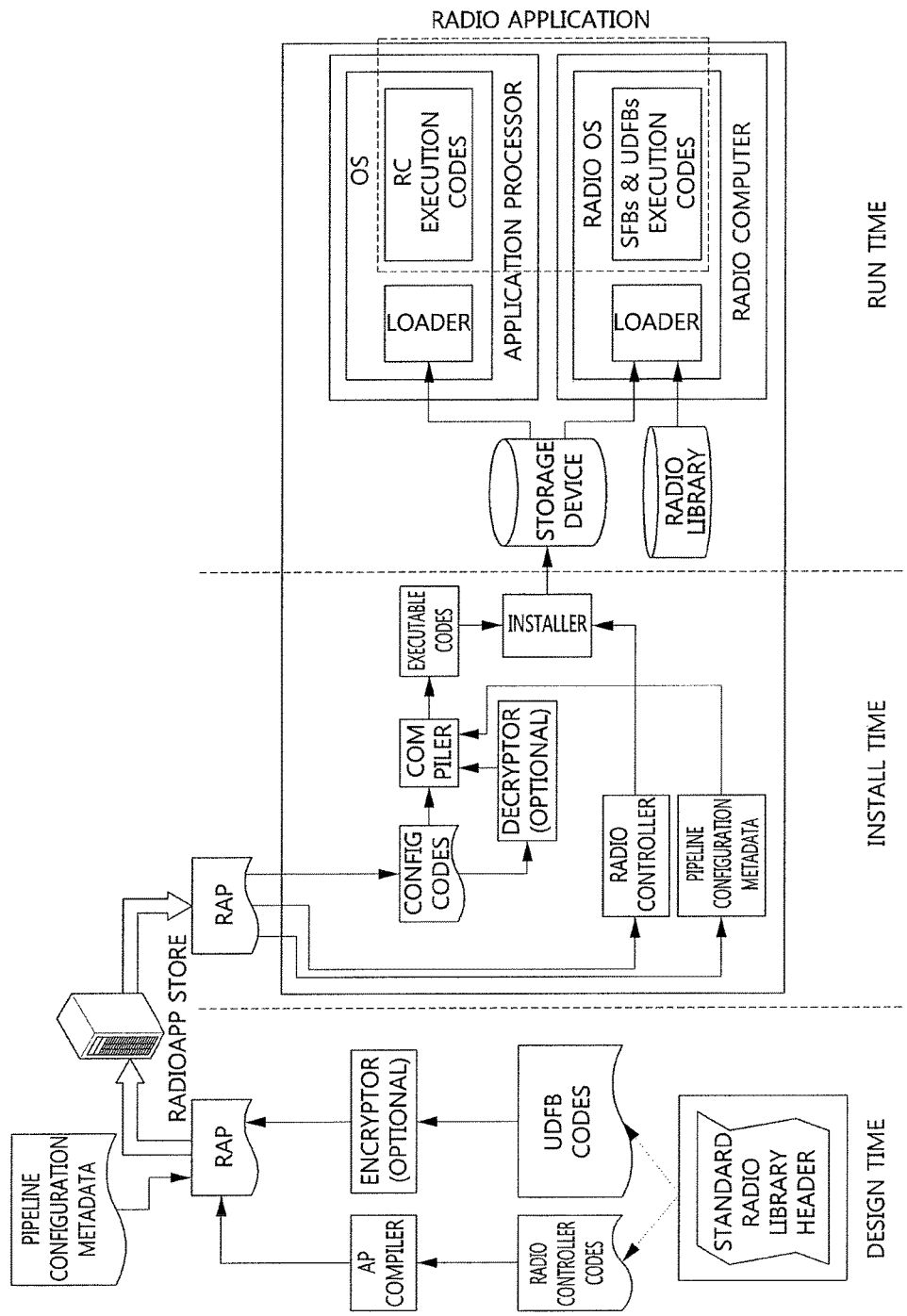

Meanwhile, in cases that radio application codes are distributed in form of source codes as shown in FIGS. 4 and 5, the source codes may be distributed as encrypted using an encryptor which is an optional component. If the codes for the radio application are distributed in form of source codes, the source codes may be compiled in the mobile device to which the radio application is to be installed so that device-independency of the radio application can be guaranteed.

Figure 6:
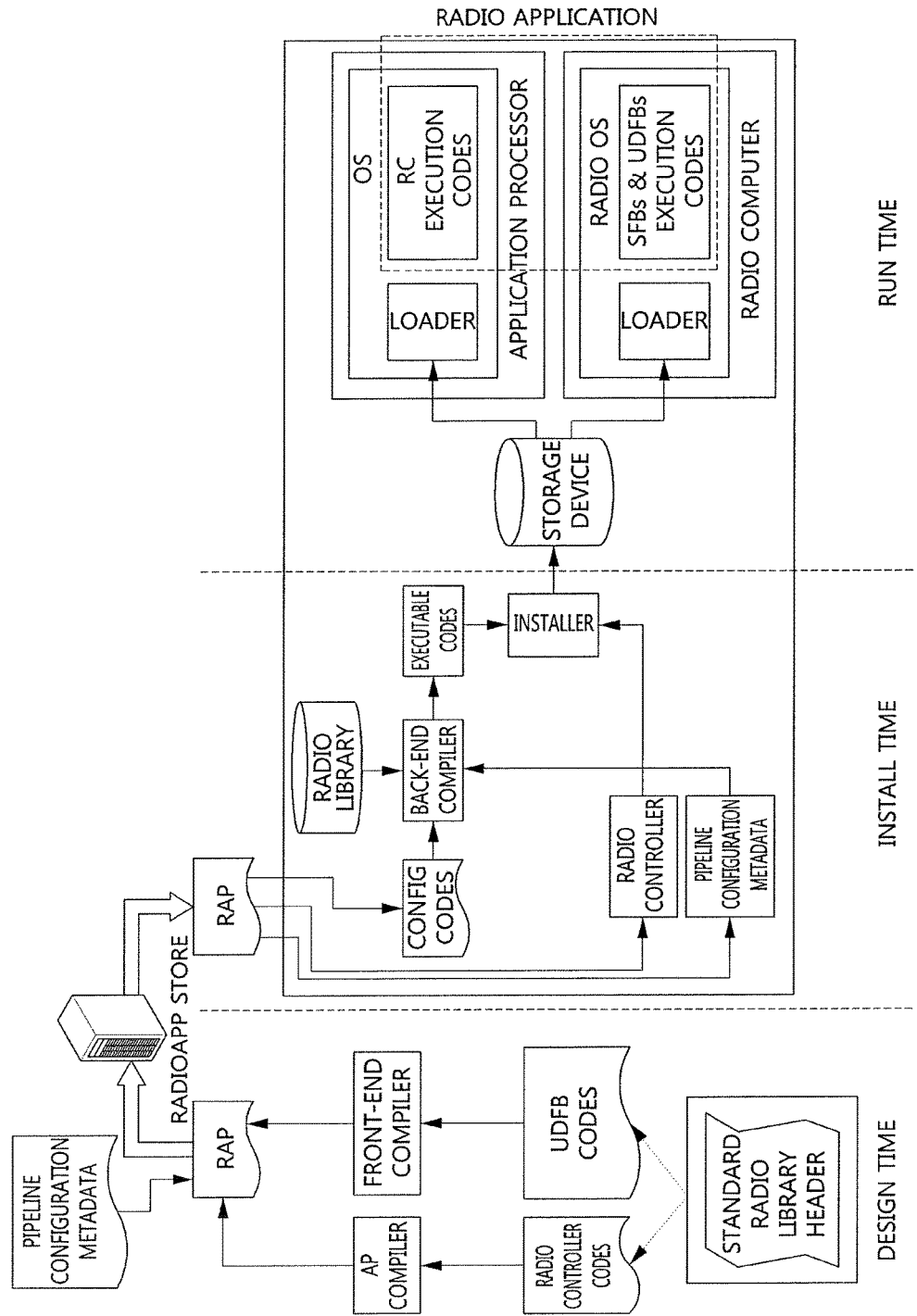
Figure 7:
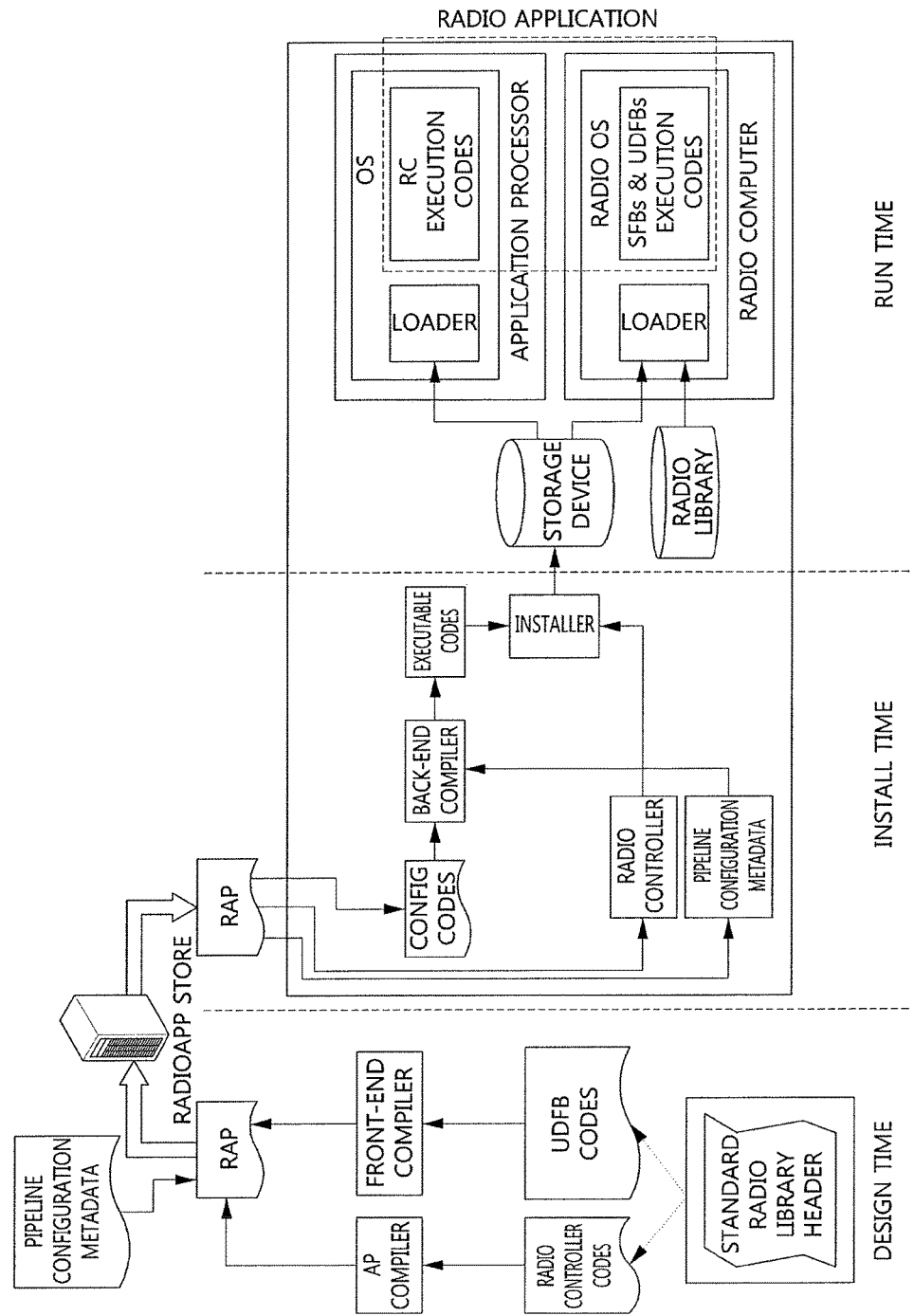

Also, in cases shown in FIG. 6 and FIG. 7, the radio application codes may be compiled into a form of IR by a front-end compiler, and included in the RAP.

Then, the generated RAP may be uploaded to a distribution server (e.g., radio app store), and prepared for download to a mobile device of a user wanting to use the radio application.

Distribution, Installation, and Execution of RAP

Hereinafter, specific exemplary embodiments of methods for distribution, installation, and execution of a RAP for a target mobile device will be described by referring to FIGS. 3 to 7.

FIG. 3 is a conceptual diagram to explain a method for distribution, installation, and execution of a radio application according to an exemplary embodiment of the present invention.

The present exemplary embodiment is for a case in which a RAP including executable codes specific to a platform of a mobile device is distributed.

Referring to FIG. 3, in order to distribute the RAP, standard and user-defined functional blocks which are located in a distributor device may be defined using a standard radio library header, respectively compiled, and included in the RAP. The RAP may further comprise a radio controller or a radio controller execution code compiled by an application processor compiler in the distributor device in addition to the standard and user-defined functional blocks.

In a design time in which configuration codes (referred to as 'configcodes') corresponding to the mobile device of the user are generated from function blocks for distribution of RAP, standard function blocks (SFBs) and user-defined function blocks (UDFBs) may be independently or differently compiled as corresponding to respective radio applications which are reconfigured for various mobile devices (e.g., compiler A, compiler B, or compiler C.) This may mean that executable codes for the user-defined function blocks and standard function blocks are compiled as corresponding to a radio computer determined before they are included in the RAP. The generated RAP may be uploaded to a radio application store (i.e., Radio App Store) by the distributor's computing device through a network.

The radio application store may obtain system information from the mobile device through data communication with the mobile device, and perform a download service of the RAP suitable to the mobile device based on the system information. The download of the RAP may be performed based on a RAP download request message included in the system information, or a separate RAP download request message transmitted to the radio application store by the mobile device.

When the RAP is downloaded to the mobile device, the mobile device may obtain the configuration codes and radio controller executable on the mobile device from the downloaded RAP, and install them in the mobile device by using an installer. In the installation of the RAP, the configuration codes and radio controller may be stored in a storage of the mobile device. The storage may comprise a high-speed random access memory such as magnetic disk storage apparatus, non-volatile memory, optical disk storage apparatus, flash memory, or a combination of them. The storage may also be referred to as a storage device.

In case that the configuration codes (referred to as 'configcodes') are codes executable on a specific platform of the mobile device, the configcodes may comprise UDFB execution codes and SFB execution codes for executing tasks related to the radio application. The UDFB execution codes and SFB execution codes, included in the configcodes, may be loaded to the mobile device by a loader of the radio OS (i.e., a second loader) so that they are executed on the radio OS of the radio computer in the mobile device. Also, executable codes of the radio controller, included in the configcodes, may be loaded to the mobile device by a loader of the first OS (i.e., a first loader) so that they are executed on the OS (hereinafter, referred to as 'first OS') of the AP in the mobile device.

That is, the mobile device may be reconfigured based on the radio application comprising the radio controller execution codes operating on the first OS of the AP and the execution codes of the function blocks operating on the radio OS of the radio computer. Like this, the mobile device may receive an execution instruction for a radio application, be reconfigured by loading executable codes of function blocks and radio controller according to the received execution instruction, and perform functions such as wireless communication functions and internet access by using a communication protocol which is newly supported through the reconfiguration.

Meanwhile, even though it was not stated in the above description, in the case that the RAP has a form of executable codes specific to the mobile device platform, the RAP may further comprise a radio library needed for the specific mobile device platform. The radio library may comprise standard function blocks for the mobile device.

FIGS. 4 and 5 are conceptual diagrams to explain a method for distribution, installation, and execution of a radio application according to another exemplary embodiment of the present invention.

The present exemplary embodiment is for a case in which a RAP including source codes independent on a platform of a mobile device is distributed. That is, FIG. 4 illustrates a case in which platform independent source codes according to a static linking structure are used, and FIG. 5 illustrates a case in which platform independent source codes according to a dynamic linking structure are used. Here, the static linking may mean a linking method in which necessary object codes are linked into a final execution code in an install time before execution of the radio application, and the dynamic linking may mean a linking method in which object codes are linked into a final execution code in an operation step during execution of the radio application when the object codes become necessary.

Referring to FIG. 4 and FIG. 5, in the design time, RA codes for a RAP may comprise only radio controller codes and user-defined functional blocks. The RAP may comprise pipeline configuration metadata. The pipeline configuration metadata may provide information for efficient compiling of standard function blocks. Calling functions of such the SFBs are needed for executing a target radio application, and the SFBs may be included in the configcodes.

Also, in the design time, at least part of the RA codes may be optionally encrypted. That is, in the design time, radio controller codes defined based on the standard radio library header may be compiled by an AP compiler of the distributor's computing device, and included in the RAP. Also, the UDFBs defined based on the standard radio library header may be encrypted by an encryptor, and included in the RAP. The encryption of the UDFBs may be performed optionally. The generated RAP may be uploaded to the radio application store from the distributor's computing device.

In an install time, the mobile device may download the RAP from the radio application store connected through a network. The mobile device may obtain the configuration codes ('configcodes'), radio controller, and pipeline configuration metadata from the downloaded RAP.

The configcodes comprising UDFBs may be compiled by the reconfigurable mobile device or a cloud system during the install time. In case that the mobile device has a compiler, the configcodes may be compiled by the compiler. That is, the mobile device may have a compiler which can compile the configcodes into specific codes executable on the mobile device. If the RA codes or configcodes are encrypted in the design time, the configcodes may be decrypted by a decryptor before the compilation.

The pipeline configuration metadata may be referred by the mobile device or the cloud system. In the case of dynamic linking, the pipeline configuration metadata included in the RAP may be referred by the compiler during the compilation of the configcodes having a source code form into the executable codes of the radio computer in the install time of the RAP.

Native implementations of the SFBs may be included in a native radio library of the mobile device, and executed in a run time.

Also, in the install time, executable codes obtained by compiling the configcodes may be installed in the mobile device by an installer. Also, the radio controller may be installed in the mobile device by the installer. In the mobile device, software, program, instruction set, or their combination generated by the installer may be stored in a storage.

Also, in the case of the static linking, as shown in FIG. 4, linking between UDFBs and SFBs may be performed in the install time by using a radio library. In the run time, compiled codes (executable codes) of the UDFBs and SFBs may be executed as loaded on the radio OS.

That is, in the run time, radio controller execution codes operating on the AP of the mobile device may be retrieved from the storage, and loaded into the AP by a loader of the first OS of the AP. Also, executable codes of the functional blocks operating on the radio computer of the mobile device may be retrieved from the storage, and loaded into the radio computer by a loader of the radio OS of the radio computer. The functional blocks may include the SFBs and the UDFBs.

Meanwhile, in the case of the dynamic linking, as shown in FIG. 5, linking between UDFBs and SFBs may be performed in the run time by using the radio library.

In other words, in the run time, a loader (e.g., dispatcher, etc.) of the first OS may load the radio controller execution codes from the storage into the AP, and a loader of the radio OS may load executable codes of function blocks (one or more UDFBs) in the storage and executable codes of one or more SFBs in the radio library of the mobile device into the radio computer.

If the compilation is performed in the cloud system, the mobile device architecture may have a structure in which a compiler does not exist. Also, in case that the configuration codes ('configcodes') of the radio application are compiled in the cloud system when the dynamic linking is used, native implementations of a radio library may exist in the mobile device, for the compilation.

FIGS. 6 and 7 are conceptual diagrams to explain a method for distribution, installation, and execution of a radio application according to yet another exemplary embodiment of the present invention.

The present exemplary embodiment is for a case in which a RAP including platform-independent IR codes is distributed. That is, FIG. 6 illustrates a case in which platform independent IR codes according to a static linking structure are used, and FIG. 7 illustrates a case in which platform independent IR codes according to a dynamic linking structure are used. In the below description, for easy understanding, explanations redundant to those of FIGS. 3 to 5 are omitted.

Referring to FIG. 6 and FIG. 7, in case that the configcodes are provided in form of platform independent IR codes, radio application codes including UDFB codes may be front-end-compiled in a design time. The UDFB codes of the configcodes, which is front-end-compiled, may be back-end-compiled into executable codes specific to a radio computer of the mobile computer, in an install time. Native implementations of the SFBs may be included in a native library.

In the case of the static linking, as shown in FIG. 6, linking between UDFBs and SFBs may be performed in the install time by using a radio library. In the run time, compiled codes (executable codes) of the UDFBs and SFBs may be executed as loaded on the radio OS.

Meanwhile, in the case of the dynamic linking, as shown in FIG. 7, linking between UDFBs and SFBs may be performed in the run time by using the radio library. Also, in the case of the dynamic linking, the pipeline configuration metadata may be referred by the mobile device or the cloud system. The pipeline configuration metadata included in the RAP may be referred by the compiler during the compilation of the configcodes having the IR code form into the executable codes of the radio computer in the install time of the RAP.

In the above-described cases, the compilation in the install time may be performed by using one of the following two methods. That is, as a first method, all operations of the install time may be performed by the mobile device or a device corresponding to the mobile device. Also, as a second method, operations of the install time excluding the operation of the installer may be performed externally (e.g., by the cloud system.) Such the cloud service may be controlled by a platform vendor in a network.

Therefore, if the compilation is performed in the cloud system, the mobile device architecture may have a structure in which a compiler does not exist. Also, in case that the configcodes of the radio application is compiled in the cloud system when the dynamic linking is used, native implementations of a radio library may exist in the mobile device, for the compilation.

According to the present exemplary embodiment, using the RAP having a form of IR codes, various input languages may be represented with the same IR and various output languages may be obtained from the same IR, so that various input languages and various output languages can be supported. Also, since high-level languages of RA source codes can be processed via the IR and thus the low-level language from the IR can be efficiently optimized, the higher processing speed and optimization of the mobile device can be achieved. Also, using the RAP having the IR form, in a virtual machine having a processing speed slower than that of machine-level languages of a platform, the IR may be recompiled, just before execution of the virtual machine, into the machine-level codes of the platform by using outputs (e.g., byte codes) of the virtual machine, and thus the processing speed of the mobile device can be remarkably enhanced.

Figure 8:
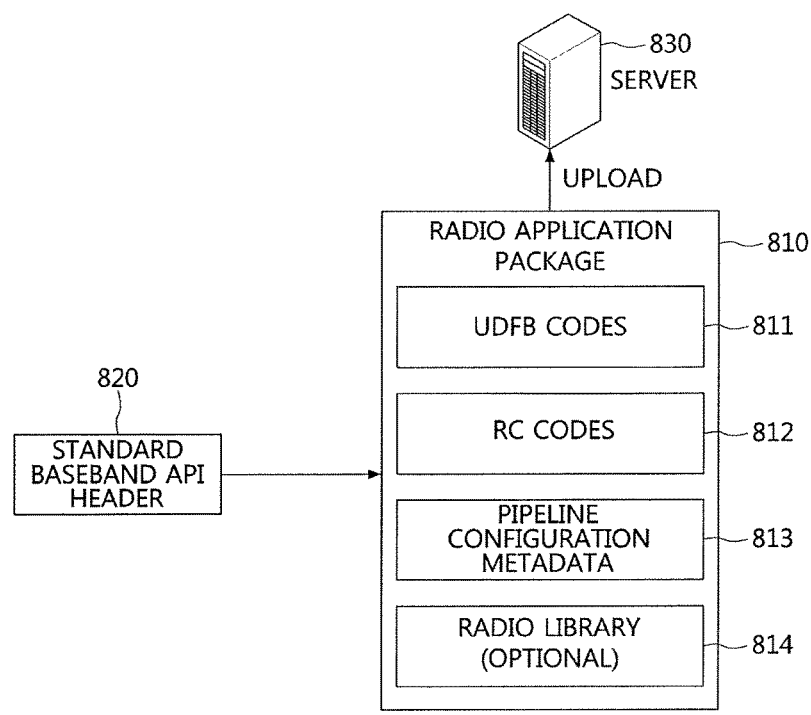
FIG. 8 is a block diagram to explain composition and distribution of a radio application package according to an exemplary embodiment of the present invention.

FIG. 8 is a block diagram to explain a composition of a radio application package according to an exemplary embodiment of the present invention.

Referring to FIG. 8, a radio application package (RAP) 810 according to the present exemplary embodiment may comprise UDFB codes 811, radio controller codes 812, and pipeline configuration metadata 813. Also, in case that executable codes specific to a platform of a mobile device are used, the RAP 810 may further comprise a radio library 814.

The UDFB codes 811 are codes for defining function blocks needed for real time implementation of the radio application. The UDFB codes 811 may include codes of function blocks for real time processing needed to implement the reconfigurable radio application as well as function blocks for modem functions of open system interconnection (OSI) layer 1, layer 2, and layer 3. Each function block may have its own unique name, input, output, and attributes.

In the case that the UDFB codes 811 are implemented as specific executable codes for the platform of the mobile device, the RAP 810 may include UDFB codes 811 compiled by a compiler among various compilers, which is suitable to the platform of the mobile device.

Also, in the case that the UDFB codes 811 are executable codes, the UDFB codes 811 and the radio library 814 may be substituted with radio application codes into which the UDFBs of the UDFB codes 811 and the SFBs in the radio library 814 are compiled together. The radio application codes may also be referred to as 'configcodes'.

Here, the radio library 814 provides SFBs which the mobile device can execute when the RAP 810 has a form of executable codes.

The above-described UDFBs may include function blocks dependent on the specific radio application. Such the function blocks may be used to support specific functions needed for the specific radio application, or to support specific algorithms used for performance enhancement. Also, the UDFBs may be related to implementations of baseband digital signal processing functions which are not implemented through SFBs defined in the standard radio library header. That is, as baseband controller function blocks, the UDFBs may be used to control function blocks processing real time context information by operating in a real time baseband processor (this may correspond to a part of the radio computer).

The SFBs may be included in the radio library, and shared by a plurality of radio applications. The SFBs may include function blocks for Forward Error Correction (FEC), Fast Fourier Transform (FFT), Inverse FFT (IFFT), interleaver/deinterleaver, turbo coding, Viterbi coding, Multiple Input Multiple Output (MIMO), beamforming, etc.

Also, the UDFB codes 811 may be configured as source codes or IR codes which need to be compiled for execution in the mobile device in addition to the above-described executable codes which can be directly executed on the radio computer of the mobile device.

The radio controller codes 812 are codes for implementing functions of a radio controller. The radio controller codes 812 may be a set of software, program, or instructions for reconfiguring a radio controller. That is, the radio controller codes 812 may include codes for transferring context information to the monitor of the CSL in the user mobile device, and exchanging data with the networking stack of the CSL.

The above-described radio controller codes 812 may be included in the RAP as executable codes which can be executed on one of the radio computer and the AP in the above-described mobile device architecture. For this, the radio controller codes 812 may be compiled by the AP compiler of the distributor's computing device.

Also, in the case that the RCF is divided into the AP processor execution part and the radio computer execution part, the radio controller codes 812 may include codes executed on the AP. In the case that the RCF operates only on the radio computer, the radio controller codes 812 may include only codes executed on the radio computer.

The pipeline configuration metadata 813 may define function blocks needed for implementing the radio application in the user mobile device, and connections between the function blocks. That is, the pipeline configuration metadata 813 may include information on connections between the standard function blocks included in the standard baseband API header 820 and the function blocks defined by the user-defined function block codes 811, and information on initial configuration values for attributes of each of the function blocks.

The pipeline means a combination of radio controller, user-defined function blocks, and standard function blocks for implementing transmission or reception functions of the radio application and their relations, and may be defined based on the pipeline configuration metadata.

Figure 12:
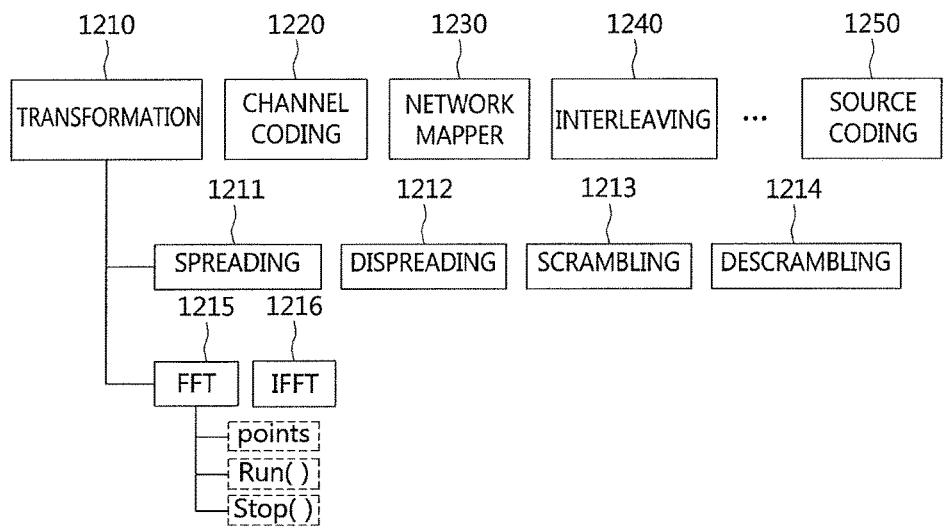
FIG. 12 is a conceptual diagram showing an example of a standard radio library interface according to an exemplary embodiment of the present invention.

The above-described RAP 810 may use the standard baseband API header 820 written in high-level language for the standard radio library interface (refer to FIG. 12). Thus, a developer of radio application may develop radio applications or RAPs 810 by referring to the standard interface API header 820. The produced RAP 810 may be distributed by being uploaded to a radio application store server 830. Also, the RAP 810 may be downloaded to the mobile device from the server 830.

According to the present exemplary embodiments, the developer or distributor of radio applications may generate RAPs for executing the same radio application in the mobile devices or user terminals having modem chips with various structures. Also, by providing various digital signal processing algorithms needed in wireless digital communication based on the standard baseband API for optimal digital signal processing, manufacturers of modem hardware may select hardware or software implementation according to complexity and power consumption of each block included in the standard baseband API, and producers of radio applications may produce radio applications which are independent of the modem hardware using the standard baseband API. Also, various extensions of the baseband API may be possible by providing user-defined type blocks to implement functions not included in the standard baseband API.

Figure 9:
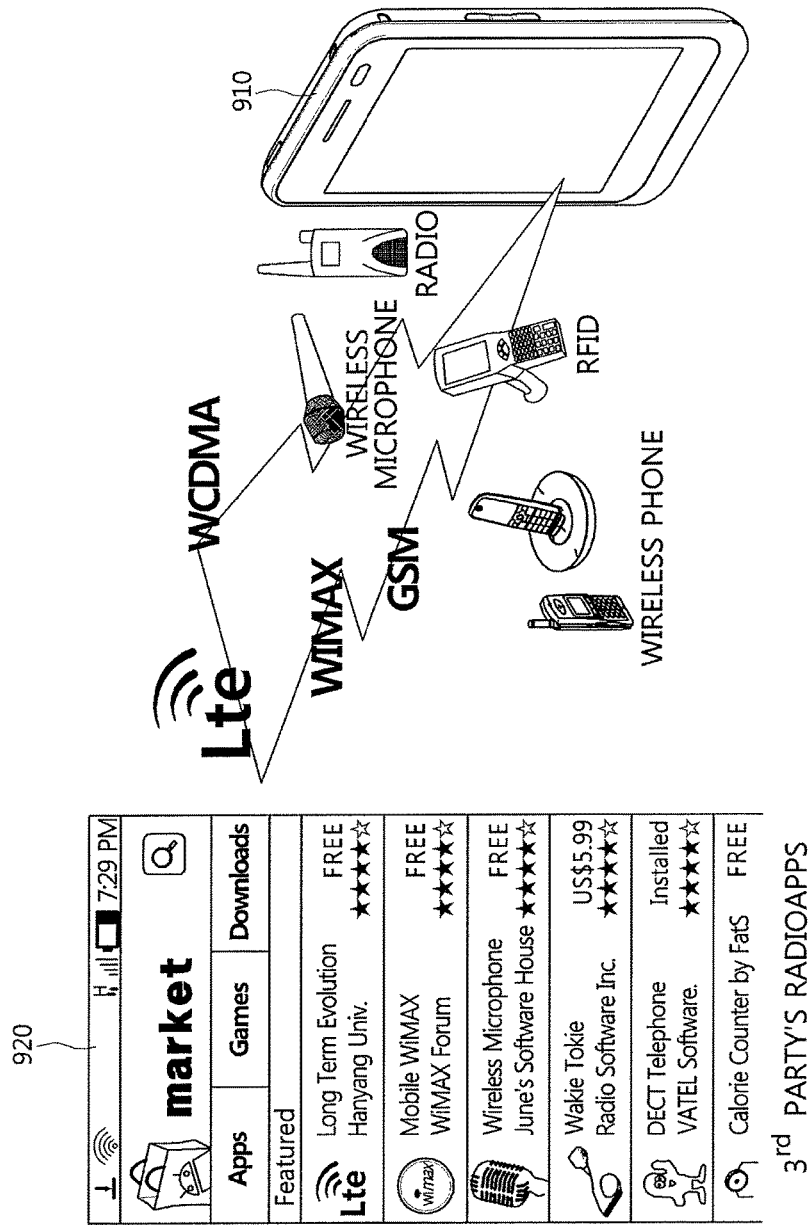
FIG. 9 is a conceptual diagram showing an example in which a radio application package of FIG. 8 is distributed through an online store.

FIG. 9 is a conceptual diagram showing an example in which a radio application package of FIG. 8 is distributed through an online store.

Referring to FIG. 9, a user may access an on-line app store 920 via a mobile device 910, select a desired radio application in a list of radio applications provided by the on-line app store, which support various radio access technologies, and download a radio application package corresponding to the selected radio application.

The various radio access technologies may include Long Term Evolution (LTE), Wideband Code Division Multiple Access (WCDMA), Worldwide Interoperability for Microwave Access (WiMax), Global System for Mobile Communications (GSM), Radio-Frequency Identification (RFID), and so on. The user may freely select a radio application to be used situationally among a plurality of radio applications which have been downloaded and installed in the terminal.

Figure 10:
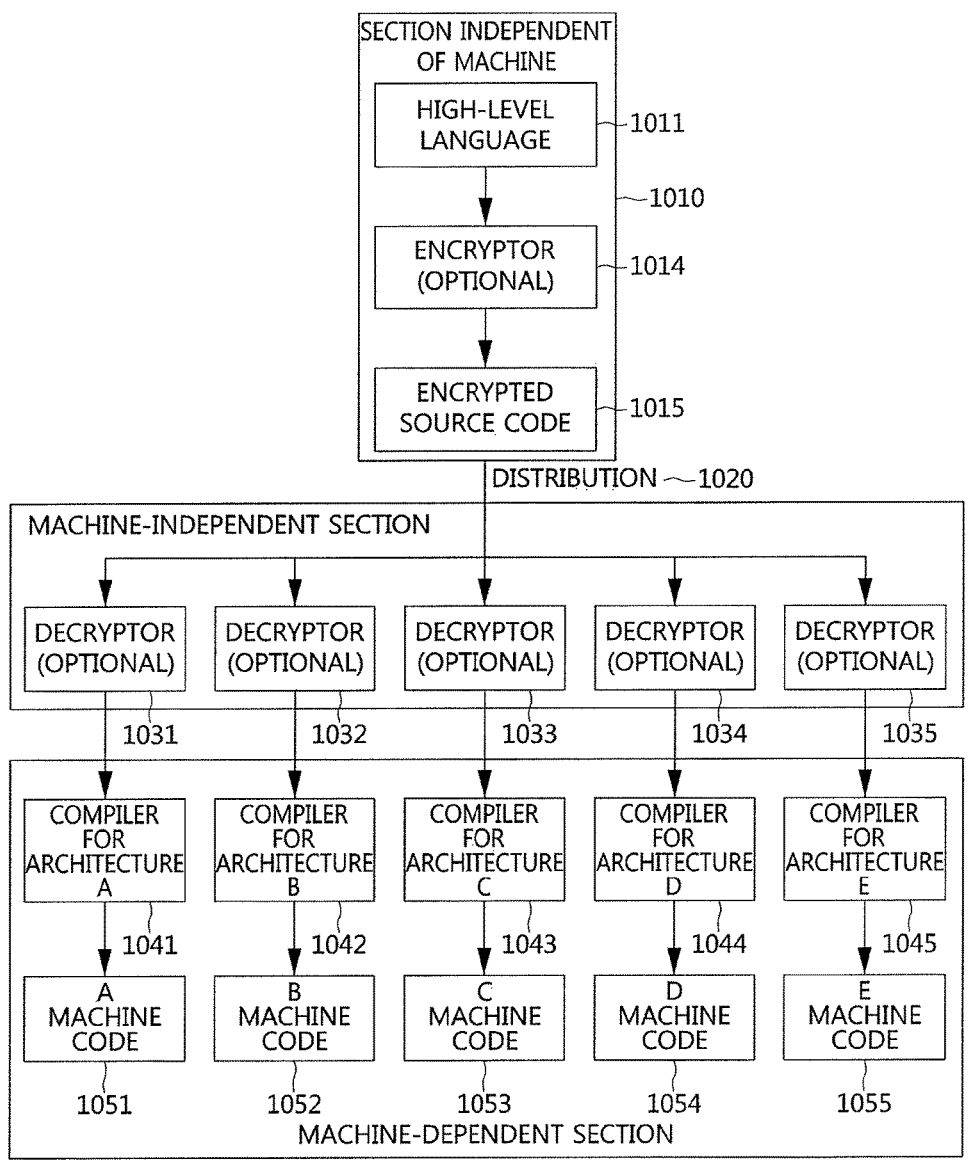
FIG. 10 is a block diagram to explain distribution and installation of a radio application package including config-codes in source code form according to an exemplary embodiment of the present invention.

FIG. 10 is a block diagram to explain distribution and installation of a radio application package including configcodes in source code form according to an exemplary embodiment of the present invention.

Referring to FIG. 10, the configcodes may be written in high-level language 1011 such as C or C++ in a machine-independent section 1010 during development of the radio application. Optionally, the configcodes may be converted into encrypted source codes 1015 by an encryptor 1014. The encrypted source codes 1015 generated in the above-described manner may be distributed to each terminal as included in radio application package 1020.

The machine-independent section 1010 may be a function part or a component of at least one computing device such as a distributor's computing device, a RAP producer's computing device, or a RAP supplier's computing device.

In order to install the RAP, the mobile device downloading the RAP may include decryptors 1031 to 1035 and compilers 1041 to 1945. The mobile device may use the decryptors 1031 to 1035 and compilers 1041 to 1945 to convert the encrypted source codes 1015 machine codes 1051 to 1055 executable in a modem hardware embedded in the mobile device.

The decryptors 1031 to 1035 may operate in the machine-independent section, and the compilers 1041 to 1045 and machine codes 1051 to 1055 may operate in the machine-dependent section. Since the compilers 1041 to 1045 are required to generate machine codes optimized for a modem hardware embedded in the mobile device, the compilers are dependent on the modem hardware. That is, the compilers may include a compiler 1041 for architecture A, a compiler 1042 for architecture B, a compiler 1043 for architecture C, a compiler 1044 for architecture D, and a compiler 1045 for architecture E. Also, the machine codes may be machine codes 1051 for architecture A, machine codes 1052 for architecture B, machine codes 1053 for architecture C, machine codes 1054 for architecture D, or machine codes 1055 for architecture E.

Radio computer vendors may develop compilers optimized for their radio computers or radio OSs, embed the compilers within their radio OSs or provide them to vendors of mobile devices using their radio computers or radio OSs. The compiler optimized for the mobile device may be implemented to operate on the radio computer or the application processor.

Meanwhile, if the configcodes in the RAP are compiled for the mobile device and distributed in executable code form, the compiling according to the present exemplary embodiment is not necessary in the RAP installation procedure for the mobile device (refer to FIG. 3).

Figure 11:
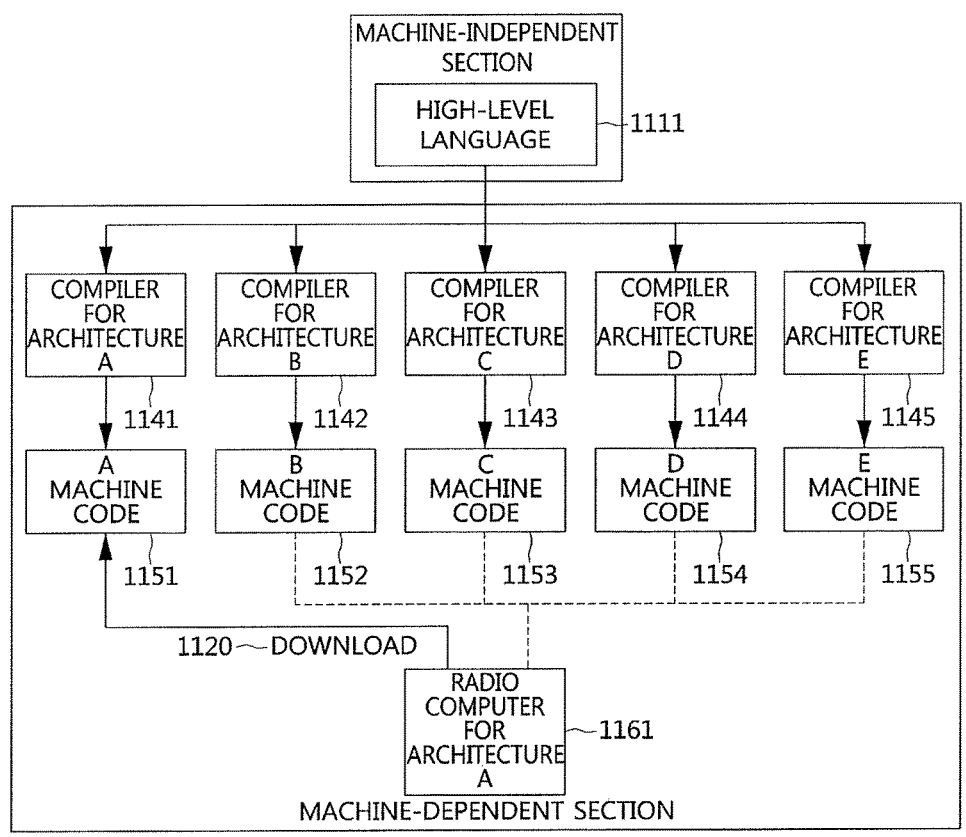
FIG. 11 is a block diagram to explain distribution and installation of a radio application package including config-codes in source code form according to another exemplary embodiment of the present invention.

FIG. 11 is a block diagram to explain distribution and installation of a radio application package including configcodes in source code form according to another exemplary embodiment of the present invention.

Referring to FIG. 10, the configcodes may be written in high-level language 1111 such as C or C++ in a machine-independent section during development of the radio application, and converted into machine codes 1151 to 1155 through compilers 1141 to 1145 for design and distribution suitable to a radio computer of a target mobile device. Such the machine codes 1151 to 1155 may be stored in a radio application server (i.e., a distribution server or a radio application store) as included in respective RAPs, and the mobile device may download the RAP suitable to its radio computer (e.g., radio computer with architecture A; 1161) 1120. Thus, suppliers of modem hardware may produce compilers 1141~1145 optimized to their modem hardware, and provide them to radio application developers.

The above-described compilers 1141 to 1145 and machine codes 1151 to 1155 may operate in the machine-dependent section of the distributor's computing device. That is, the compilers may include a compiler 1141 for architecture A, a compiler 1142 for architecture B, a compiler 1143 for architecture C, a compiler 1144 for architecture D, and a compiler 1145 for architecture E. Also, the machine codes may be machine codes 1151 for architecture A, machine codes 1152 for architecture B, machine codes 1153 for architecture C, machine codes 1154 for architecture D, or machine codes 1155 for architecture E.

Referring to FIGS. 3 to 7 in connection with the present exemplary embodiment, the installation of the radio application may be performed in the application processor or radio computer. For example, the compiler and/or storage may be one or both of the application processor and the radio computer.

FIG. 12 is a conceptual diagram showing an example of a standard radio library interface according to an exemplary embodiment of the present invention.

Referring to FIG. 12, a standard radio library interface 820 according to the present exemplary embodiment, as an application programming interface (API) standardizing digital signal processing algorithms needed for baseband domain in modem, may correspond to the standard baseband API in FIG. 8. The standard radio library interface 820 may include the standard interfaces 1210~1250 and the standard function blocks 1211~1214 belonging to the 'transformation' standard interface 1210.

As a type of the standard interface, the standard interface may include a transformation 1210, a channel coding 1220, a network mapper 1230, an interleaving 1240, and a source coding 1250 and so on. Also, as standard function blocks for the transformation 1210, a spreading 1211, a dispreading 1212, a scrambling 1213, a descrambling 1214, a Fast Fourier Transform (FFT) 1215 and an Inverse Fast Fourier Transform (IFFT) 1216 may be defined.

Also, Input/Out data for the FFT 1215, properties of the data (e.g., points, etc.), and member functions (e.g., Run( ) Stop( ) etc.) may be defined for the FFT 1215. Also, an object-oriented design of radio application may be made possible by assigning common properties to function blocks having the same type.

Exemplary Embodiment of Distribution of Radio Application

Hereinafter, a method for distributing a radio application for a software defined radio terminal (user terminal or mobile device) according to an exemplary embodiment of the present invention will be explained in detail.

Figure 13:
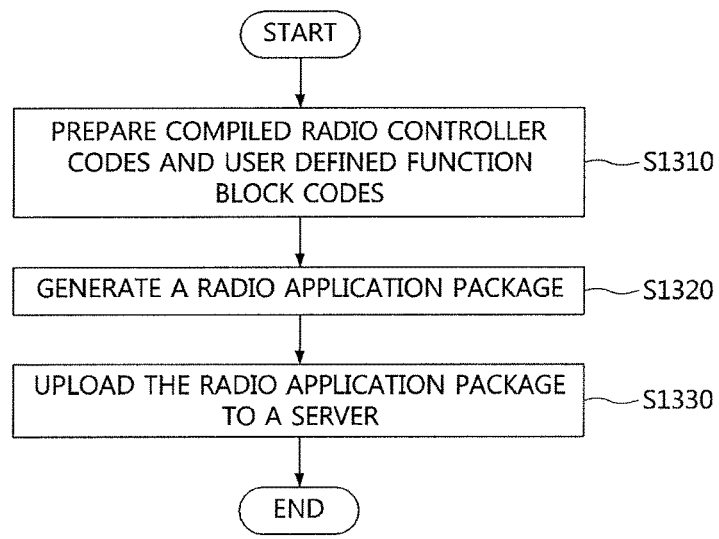
FIG. 13 is a flow chart to explain a procedure of distributing a radio application according to an exemplary embodiment of the present invention.

FIG. 13 is a flow chart to explain a procedure of distributing a radio application according to an exemplary embodiment of the present invention.

Referring to FIG. 13, a procedure of distributing a radio application according to an exemplary embodiment of the present invention may comprise a step of preparing a radio application package S1310, a step of generating a radio application package S1320, and a step of distributing a radio application package S1330. The distribution procedure may include a procedure of designing a radio application, and vice versa.

Respective steps will be described as follows.

The step of preparing a RAP (S1310) is a step of preparing codes of UDFBs and a radio controller which will be included in the RAP. In addition to the codes of UDFBs and radio controller, the RAP may further comprise a radio library and/or metadata. The radio library may provide SFBs to a mobile device which is a target of software defined radio reconfiguration. The metadata defines relations between the above-described components, and may be referred to as pipeline configuration metadata.

The step of generating a RAP S1320 is a step of generating a radio application package including radio application to be executed in a software defined radio terminal. Referring to FIG. 8, the radio application package may comprise radio application codes, radio controller codes and pipeline configuration metadata. The radio application codes may be referred to as 'configcodes' which are compiled results of the UDFBs.

The step of generating a RAP S1320 may comprise a step of generating and compiling radio application codes, a step of generating and compiling radio controller codes, and a step of generating pipeline configuration metadata and generating a radio application package.

Also, the step of generating a RAP S1320 may further comprise a step of encrypting the user-defined function block codes to be included in the RAP. In the encryption, both of the user-defined function block codes and the standard function block codes may be encrypted. Such the encryption may be useful when the radio application codes including codes of UDFBs and/or SFBs are distributed in source code form or IR form.

That is, in the case that the radio application codes are distributed in source code form, they should be written in standard high-level language so that they can be compiled in various mobile devices. In this case, the source codes may be disclosed. Thus, disclosure of them can be prevented by distributing them as encrypted.

Also, in the case that the radio application codes are distributed as codes executable in the mobile device, the radio application codes are prepared by at least one compiler corresponding to the mobile device. Similarly to this, the radio controller codes are compiled by the AP compiler of the distributor's computing device and prepared as a radio controller or radio controller execution codes.

The generated radio application codes, radio controller codes, and pipeline configuration metadata may be packaged into a RAP.

The step of distributing a RAP (S1330) is a step of uploading the RAP generated in the above-described manner to a radio application distribution server, and making it possible for a software defined radio terminal (mobile device) wanting the radio application to download the radio application.

Exemplary Embodiment of Installation of Radio Application

Hereinafter, a procedure of installing and executing a radio application according to an exemplary embodiment of the present invention will be explained.

Figure 14:
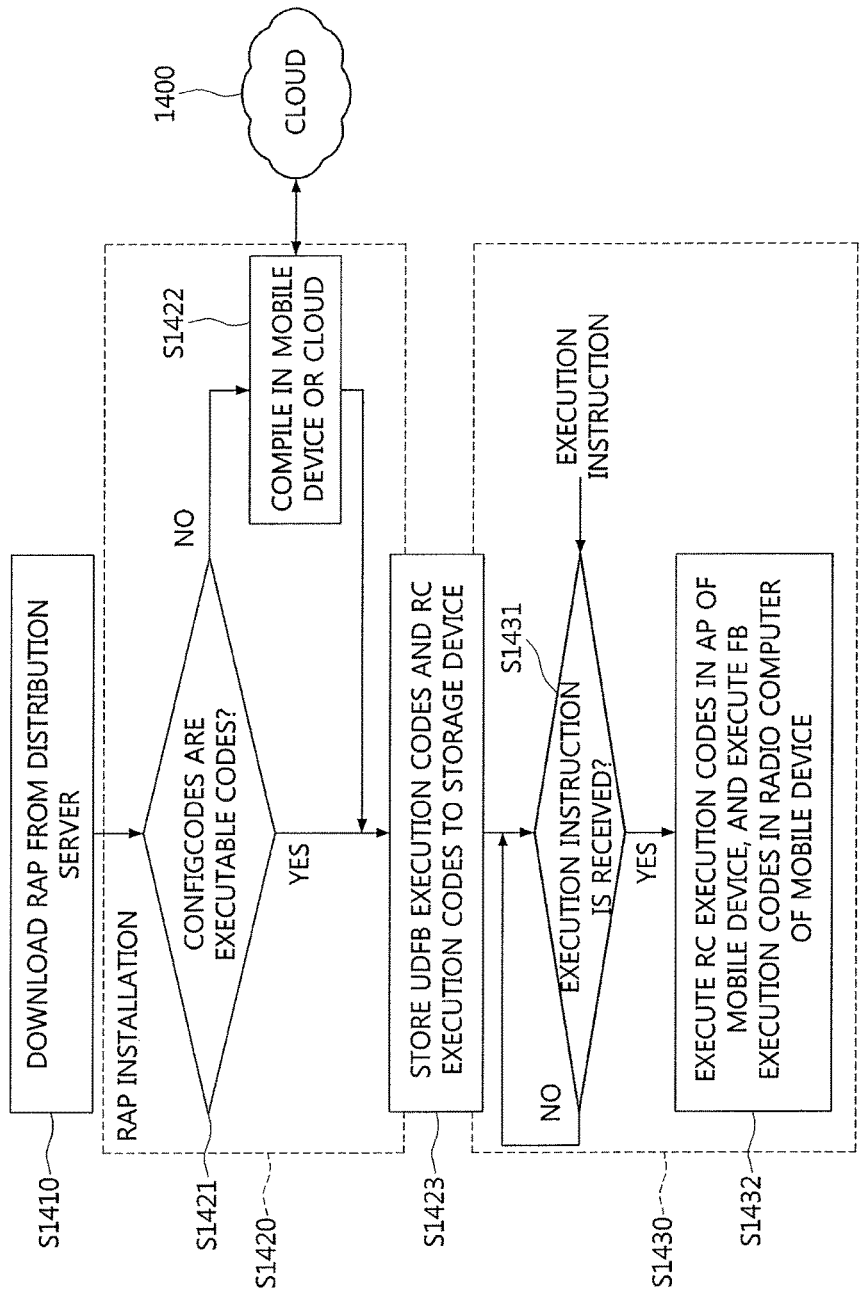
FIG. 14 is a flow chart to explain a procedure of installing and executing a radio application according to an exemplary embodiment of the present invention.

FIG. 14 is a flow chart to show a procedure of installing and executing a radio application according to an exemplary embodiment of the present invention.

Referring to FIG. 14, a procedure of installing and executing a radio application according to an exemplary embodiment may comprise a step of downloading a RAP S1410, a step of installing a RAP S1420, and a step of executing a radio application S1430.

The step of downloading a RAP S1410 is a step of downloading a RAP from a distribution server connected through a network in order to execute a radio application in a software defined radio terminal (mobile device). The RAP may include radio application codes, radio controller codes, and pipeline configuration metadata.

Then, the step of installing a RAP S1420 is a step of installing function block execution codes and radio controller execution codes downloaded from the distribution server to the mobile device, and may include a step of determining whether the downloaded configcodes are executable codes S1421, a step of compiling S1422, and a step of storing S1423.

In the step of determining S1421, it is determined whether the radio application codes or configcodes included in the RAP are codes executable in the mobile device or not. If the codes are executable codes, the following step of compiling S1422 may be skipped and the step of storing S1423 may be performed.

In the step of compiling S1422, if the radio application codes or configcodes included in the RAP have source code form or IR form, the codes are compiled. The step of compiling S1422 may be performed by a compiler embedded in the mobile device. However, without being restricted thereto, a compiler located in a cloud 1400 connected to the mobile device through a network may perform the step of compiling 1422.

In the case that the radio application codes or configcodes are distributed in IR form, a back-end compiler may be used. According to the step of compiling S1422, the UDFB execution codes and radio controller (RC) execution codes may be generated. Also, in the step of compiling S1422, the mobile device may generate function block execution codes into which the codes of UDFBs and SFBs are linked based on the radio library and pipeline configuration metadata, according to the distribution manner of the RAP.

Meanwhile, if the configcodes having source code form are encrypted, the configcodes may be decrypted by a decryptor of the mobile device before the step of compiling S1422.

In the step of storing S1423, the installer of the mobile device may store the pipeline configuration metadata, the executable codes of function blocks including the UDFBs, and the RC execution codes, which are included in the RAP, to a storage device. Here, the installer may store the function block execution codes, the RC execution codes, and SFBs using standard commands written based on the predefined standard baseband interface to the storage device of the mobile device, by referring to the pipeline configuration metadata.

Then, the step of executing the radio application S1430 may comprise a step of receiving an execution instruction S1431 and a step of loading executable codes S1432.

In the step of receiving an execution instruction S1431, an execution instruction for a radio application may be received from a user application of the mobile device, a user interface of the mobile device, or another mobile device accessible to the mobile device through a network. The execution instruction may include any command which can execute the radio application installed in the storage device of the mobile device.

In the step of loading executable codes S1432, in response to the execution instruction, the UDFB execution codes and the RC execution codes, which are stored in the storage device, may be executed in the mobile device. In the step S1432, the UDFB execution codes may be directly loaded to the radio computer of the mobile device, and the RC execution codes may be directly loaded to the AP of the mobile device. Here, the loader of the radio computer may perform linking between the UDFB execution codes and the SFB execution codes in the radio library of the mobile device in real time, and execute the linked SFBs and UDFBs in the radio computer.

In other words, after the RAP is downloaded to the mobile device, the radio controller in the RAP may be installed in the storage device of the mobile device by the installer. The radio controller installed in the storage device may have a form of RC execution codes. The RC execution codes for operations, which do not need real time processing such as context information processing, may be installed in the AP. However, functional block execution codes of the radio application codes should be installed in the radio computer since they should be processed in real time.

The above-described step of executing a radio application S1430 is a step in which the radio application installed in the storage device actually operates in the mobile device. In the step S1430, in order to process radio signals, corresponding components of the radio application may be loaded to the AP or the radio computer, and perform actual radio communication functions.

For example, when an execution instruction for the radio application installed in the mobile device is received, the loader may determine which function blocks are required to execute the radio application by referring to the pipeline configuration metadata. Based on the determination, the RC execution codes and function block execution codes may be loaded from the storage device to a corresponding region of the mobile device. Also, the loader may load the RC codes to the AP or the radio computer (the region to which the RC codes are loaded may be determined according to an operating layer of the RCF), and load the UDFBs and the SFBs to the radio computer by referring to the pipeline configuration metadata.

The radio library, as a set of SFBs, may exist in the radio computer or the AP. In a SFB pool of the mobile device, SFBs implemented using dedicated hardware and SFBs executed on the radio computer may exist. The SFB pool may be used when SFBs used by the corresponding radio application are selected and installed to the storage device, in the installation procedure of the radio application where the pipeline configuration metadata are referred. Also, the SFB pool may be used when the loader selects SFBs used by the corresponding radio application and load them to the radio computer, in the step of executing the radio application.

Radio Virtual Machine for Multiradio Application

Figure 15:
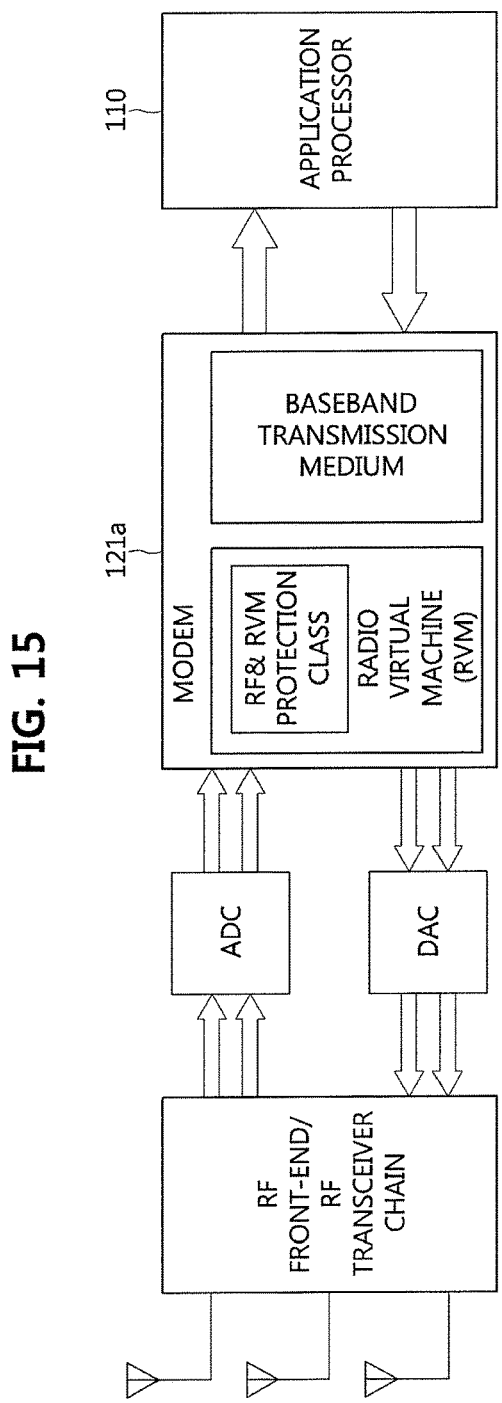
FIG. 15 is a conceptual diagram to explain a software (re-)certification process using a radio virtual machine according to an exemplary embodiment of the present invention.

FIG. 15 is a conceptual diagram to explain a software (re-)certification process using a radio virtual machine according to an exemplary embodiment of the present invention.

The radio virtual machine (RVM) according to the present exemplary embodiment is a controlled execution environment for software affecting radio characteristics of the mobile device. The situation, in which reconfigurable software (i.e., radio application) is loaded to the RVM, is assumed.

Referring to FIG. 15, a typical radio equipment architecture of the mobile device may comprise a RF transceiver chain, an analog-to-digital converter (ADC), a digital-to-analog converter (DAC), and a baseband processing.

The ADC and DAC may connect the RF transceiver chain/RF front-end with a modem 1210 including the RVM and a baseband transmission medium. The RVM may be connected to the AP 110 of the mobile device (user terminal) via the baseband transmission medium. The baseband transmission medium may include hard-wired ASIC-type of baseband implementation. Also, the AP may comprise a Medium Access Control (MAC) layer (layer 2) and a higher layer processing part.

The RVM may enable the radio application to select one of various available protection classes for codes executed on the RVM as well as protection classes for the RF front-end. That is, the RVM may control selection of RF transceiver chains, especially, selection of RF and RVM protection classes.

Required certification or re-certification process on a software reconfigurable radio platform may be performed based on a combination of the selected RF and RVM protection class.

While the exemplary embodiments of the present invention and their advantages have been described in detail, it should be understood that various changes, substitutions and alterations may be made herein without departing from the scope of the invention.

The invention claimed is:

1. A radio application distribution method for installing a radio application in a user terminal using a radio application package (RAP), comprising:

generating a RAP including radio controller codes compiled by an application processor (AP) compiler and user-defined function block codes; and uploading the RAP to a server, wherein the radio controller codes are in form of executable codes executed by the AP or a radio computer of the user terminal, provide a user application of the user terminal with context information of a radio application to be installed in the user terminal, or define a radio controller for transmitting and receiving data with a networking stack of a communication service layer located in the AP, wherein the user-defined function block codes are included in the RAP in form of executable codes executed on the AP or the radio computer, or in form of source codes or intermediate representation (IR) which can be compiled to codes executable on the AP or the radio computer, and wherein the RAP further comprises pipeline configuration metadata for configuring pipelines of the radio application when the user-defined function block codes are included in the RAP in form of source codes or the IR, and the pipeline configuration metadata define relations among the radio controller codes, the user-defined function block codes, and the standard function block codes for data transmission functions or data reception functions of the radio application.

2. The radio application distribution method according to claim 1, wherein the RAP further comprises standard function block codes when the user-defined function block codes are included in the RAP in form of executable codes, and radio application codes including the standard function block codes and the user-defined function block codes are included in the RAP as compiled by at least one compiler.

3. The radio application distribution method according to claim 1, wherein the user-defined function block codes are included in the RAP as compiled by a front-end compiler when the user-defined function block codes are included in the RAP in form of source codes.

4. A radio application installation method for installing a radio application in a user terminal using a radio application package (RAP), comprising:

downloading, from a server, a RAP including radio controller codes compiled by an application processor (AP) compiler of a radio application supplier and user-defined function block codes; and installing the RAP in the user terminal, wherein the radio controller codes are in form of executable codes executed by the AP or a radio computer of the user terminal, provide a user application of the user terminal with context information of a radio application to be installed in the user terminal, or define a radio controller for transmitting and receiving data with a networking stack of a communication service layer located in the AP, wherein the user-defined function block codes are included in the RAP in form of executable codes executed on the AP or the radio computer, or in form of source codes or intermediate representation (IR) which can be compiled to codes executable on the AP or the radio computer, wherein, when the user-defined function block codes are included in the RAP in form of source codes, configuration codes including the user-defined function block codes are compiled to executable codes by a compiler of the user terminal or a compiler of a cloud connected to the user terminal with pipeline configuration metadata of the RAP, and the compiled executable codes are installed in a storage device of the user terminal by an installer of the user terminal together with the radio controller included in the RAP, and wherein, when the user-defined function block codes are included in the RAP in form of the IR, the configuration codes including the user-defined function block codes are compiled to executable codes by a back-end compiler of the user terminal or a back-end compiler of the cloud connected to the user terminal with the pipeline configuration metadata of the RAP, and the compiled executable codes are installed in a storage device of the user terminal by the installer of the user terminal together with the radio controller included in the RAP.

5. The radio application installation method according to claim 4, wherein the RAP further comprises standard function block codes when the user-defined function block codes are included in the RAP in form of executable codes, and configuration codes including the standard function block codes and the user-defined function block codes are installed in a storage device of the user terminal by an installer of the user terminal together with the radio controller or the radio controller codes included in the RAP.

6. The radio application installation method according to claim 4, wherein, when the user-defined function block codes of the configuration codes are compiled by referring to the pipeline configuration metadata, the compiler generates the executable codes by compiling the user-defined function block codes together with standard function block codes in a radio library of the user terminal.

7. The radio application installation method according to claim 4, further comprising, before the installing the RAP in the user terminal, decrypting the configuration codes by using a decryptor of the user terminal or a decryptor of a cloud connected to the user terminal, and providing the decrypted configuration codes to the compiler.

8. The radio application installation method according to claim 4, wherein, when the user-defined function block codes of the configuration codes are compiled by referring to the pipeline configuration metadata, the compiler generates the executable codes by compiling the user-defined function block codes together with standard function block codes in a radio library of the user terminal.

9. A radio application execution method for executing a radio application stored in a storage device of a user terminal having an application processor (AP) and a radio computer, comprising:

downloading, from a server, a radio application package (RAP) including radio controller codes, user-defined function block codes, and pipeline configuration metadata;

compiling the radio controller codes into radio controller execution codes by the AP and installing the radio controller execution codes in the storage device;

compiling the user-defined function block codes by the AP or the radio computer into user-defined function block execution codes and installing the user-defined function block execution codes in the storage device, when the user-defined function block codes are in form of source codes or intermediate representation (IR), or installing the user-defined function block codes in the storage device as the user-defined function block execution codes, when the user-defined function block codes are in form of executable codes executed on the AP or the radio computer;

receiving an execution instruction for the radio application;

in response to the execution instruction, executing, by a first loader operating in a first operating system of the AP, the radio controller execution codes in the AP; and in response to the execution instruction, executing, by a second loader operating in a radio operating system of the radio computer, the user-defined function block execution codes in the radio computer, wherein one or both of the first loader and the second loader refer to the pipeline configuration metadata, and the pipeline configuration metadata define relations among the radio controller execution codes and the user-defined function block execution codes for data transmission functions or data reception functions of the radio application.

10. The radio application execution method according to claim 9, wherein the storage device pre-stores standard function block execution codes which are codes calling function blocks implemented using dedicated hardware accelerators included in the radio computer or executable codes operating on the radio computer of the user terminal, and wherein the user-defined function block execution codes are codes which are not provided as the standard function block execution codes or which are customized from functions provided by the standard function block execution codes.

11. The radio application execution method according to claim 9, wherein the second loader executes, in the radio operating system of the radio computer, a radio library stored in the storage device together with the user-defined function block execution codes.

12. The radio application execution method according to claim 11, wherein the second loader executes, in the radio operating system of the radio computer, standard function block execution codes in a radio library, by linking the standard function block execution codes and the user-defined function block execution codes.

\* \* \* \* \*